United States Patent
Cho et al.

(10) Patent No.: US 8,374,248 B2
(45) Date of Patent: Feb. 12, 2013

(54) VIDEO ENCODING/DECODING APPARATUS AND METHOD

(75) Inventors: Dae-sung Cho, Seoul (KR); Hyun-mun Kim, Seongnam-si (KR); Dae-hee Kim, Suwon-si (KR); Jae-woo Jung, Cheonan-si (KR); Woong-il Choi, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 960 days.

(21) Appl. No.: 12/285,785

(22) Filed: Oct. 14, 2008

(65) Prior Publication Data

US 2009/0185621 A1   Jul. 23, 2009

(30) Foreign Application Priority Data

Jan. 21, 2008   (KR) ................. 10-2008-0006387

(51) Int. Cl.
 *H04N 7/12* (2006.01)
(52) U.S. Cl. .......... 375/240.16; 375/240.01; 375/240.12
(58) Field of Classification Search ............. 375/240.16, 375/240.01, 240.12
 See application file for complete search history.

(56) References Cited

U.S. PATENT DOCUMENTS

| | | | |
|---|---|---|---|
| 6,272,178 B1 * | 8/2001 | Nieweglowski et al. | 375/240.03 |
| 6,628,714 B1 * | 9/2003 | Fimoff et al. | 375/240.16 |
| 6,665,344 B1 * | 12/2003 | Fimoff | 375/240.2 |
| 6,895,051 B2 * | 5/2005 | Nieweglowski et al. | 375/240.03 |
| 2001/0031003 A1 * | 10/2001 | Sawhney et al. | 375/240.14 |
| 2002/0030695 A1 * | 3/2002 | Narui et al. | 345/698 |
| 2004/0022518 A1 * | 2/2004 | Taga et al. | 386/46 |
| 2005/0169379 A1 * | 8/2005 | Shin et al. | 375/240.16 |
| 2005/0195900 A1 * | 9/2005 | Han | 375/240.21 |
| 2006/0088102 A1 * | 4/2006 | Lee et al. | 375/240.16 |
| 2006/0120450 A1 * | 6/2006 | Han et al. | 375/240.03 |
| 2006/0126952 A1 * | 6/2006 | Suzuki et al. | 382/233 |
| 2007/0280350 A1 * | 12/2007 | Mathew et al. | 375/240.03 |

OTHER PUBLICATIONS

Espacenet search, Espacenet Result list, Sep. 2011.*
ISO 13818-1, ISO/IEC 13818-1 2nd Edition, Dec. 2000.*
ISO 14496-2, ISO/IEC 14496-2 2nd Edition Dec. 2001.*
Aramvith et al, MPEG-1 and MPEG-2 Video Standards, 1999.*

* cited by examiner

*Primary Examiner* — Jung Kim
*Assistant Examiner* — Shan Elahi
(74) *Attorney, Agent, or Firm* — Staas & Halsey LLP

(57) ABSTRACT

Provided are a resolution varying video encoding/decoding apparatus and method are provided. The video encoding apparatus comprises a resolution varying encoder to perform an encoding operation using motion estimation and compensation on a current image having a first resolution and a current image having a second resolution according to a resolution control signal to generate a bitstream, and a controller to generate the resolution control signal for varying a resolution to the first resolution or the second resolution at a predetermined interval. The video decoding apparatus comprises an analyzer to analyze a bitstream composed of encoded data having a first resolution or a second resolution and to generate a resolution control signal corresponding to a resolution flag included in the bitstream, and a resolution varying decoder to perform a decoding operation using motion compensation on encoded data having the first resolution and encoded data having the second resolution according to the resolution control signal to generate a reconstructed image.

20 Claims, 19 Drawing Sheets

VIDEO ENCODING/DECODING APPARATUS AND METHOD

CROSS-REFERENCE TO RELATED PATENT APPLICATION

This application claims the benefit of Korean Patent Application No. 10-2008-0006387, filed on Jan. 21, 2008, in the Korean Intellectual Property Office, the disclosure of which is incorporated herein in its entirety by reference.

BACKGROUND

1. Field

One or more embodiments of the present invention relate to video encoding and decoding and, more particularly, to a video encoding/decoding apparatus and method for varying the spatial resolution of frames at a predetermined interval in a video sequence composed of a plurality of frames, encoding the video sequence to generate bitstreams and decoding the generated bitstreams.

2. Description of the Related Art

Conventional moving image encoding methods include MPEG-1, MPEG-2 and MPEG-4 established by ISO/IECSC29/WNG11 MPEG (Moving Picture Expert Group) that is an international standards organization and H.261, H.262 and H.263 established by ITU-T SG16/Q6 VCEG (Video Coding Expert Group) that is another international standards organization. MPEG-4 AVC/H.264 established by JVT (Joint Video Team) that is a joint project of MPEG and VCEG is a representative standardization technique in current video compression. Furthermore, SMPTE (Society of Motion Picture and Television Engineers) established VC-1 video compression standardization technique.

These standardization techniques employ a method of reducing computational complexity in a decoder while allowing complicated computations in an encoder. However, an encoder with high complexity is not suitable for environments in which a user personally produces contents or performs communication in real time because the encoder requires an excessively large computational load to perform motion estimation and compensation to result in a delay in an encoding process.

SUMMARY

One or more embodiments of the present invention provides a video encoding apparatus and method for varying the resolution of a video sequence at a predetermined interval, encoding the video sequence and generating bitstreams from data encoded in at least two resolutions.

One or more embodiments of the present invention also provides a video decoding apparatus and method for decoding bitstreams including data encoded in at least two resolutions.

To achieve the above and/or other aspects and advantages, one or more embodiments of the present invention may include a video encoding apparatus comprising: a resolution varying encoder to perform an encoding operation using motion estimation and compensation on a current image having a first resolution and a current image having a second resolution according to a resolution control signal to generate a bitstream; and a controller to generate the resolution control signal for varying a resolution to the first resolution or the second resolution at a predetermined interval.

To achieve the above and/or other aspects and advantages, one or more embodiments of the present invention may include a video encoding method comprising: generating a resolution control signal for varying a resolution to a first resolution or a second resolution at a predetermined interval; and performing an encoding operation using motion estimation and compensation on a current image having the first resolution and a current image having the second resolution according to the resolution control signal.

To achieve the above and/or other aspects and advantages, one or more embodiments of the present invention may include a video decoding apparatus comprising: an analyzer to analyze a bitstream composed of encoded data having a first resolution or a second resolution and generating a resolution control signal corresponding to a resolution flag included in the bitstream; and a resolution varying decoder to perform a decoding operation using motion compensation on encoded data having the first resolution and encoded data having the second resolution according to the resolution control signal to generate a reconstructed image.

To achieve the above and/or other aspects and advantages, one or more embodiments of the present invention may include a video decoding method comprising: analyzing a bitstream composed of encoded data having a first resolution or a second resolution and generating a resolution control signal corresponding to a resolution flag included in the bitstream; and performing a decoding operation using motion compensation on encoded data having the first resolution and encoded data having the second resolution according to the resolution control signal to generate a reconstructed image.

The video encoding method and the video decoding method can be embodied as computer readable codes on computer readable recording media storing programs.

The video encoding/decoding apparatus and method according to embodiments of the present invention vary the resolution of a video sequence at a predetermined interval and encode the video sequence to generate a bitstream composed of data encoded in at least two resolutions. Accordingly, the quantity of computations required for motion estimation can be remarkably reduced when the resolution is decreased, and thus the quantity of computations required to encode the video sequence can be decreased.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
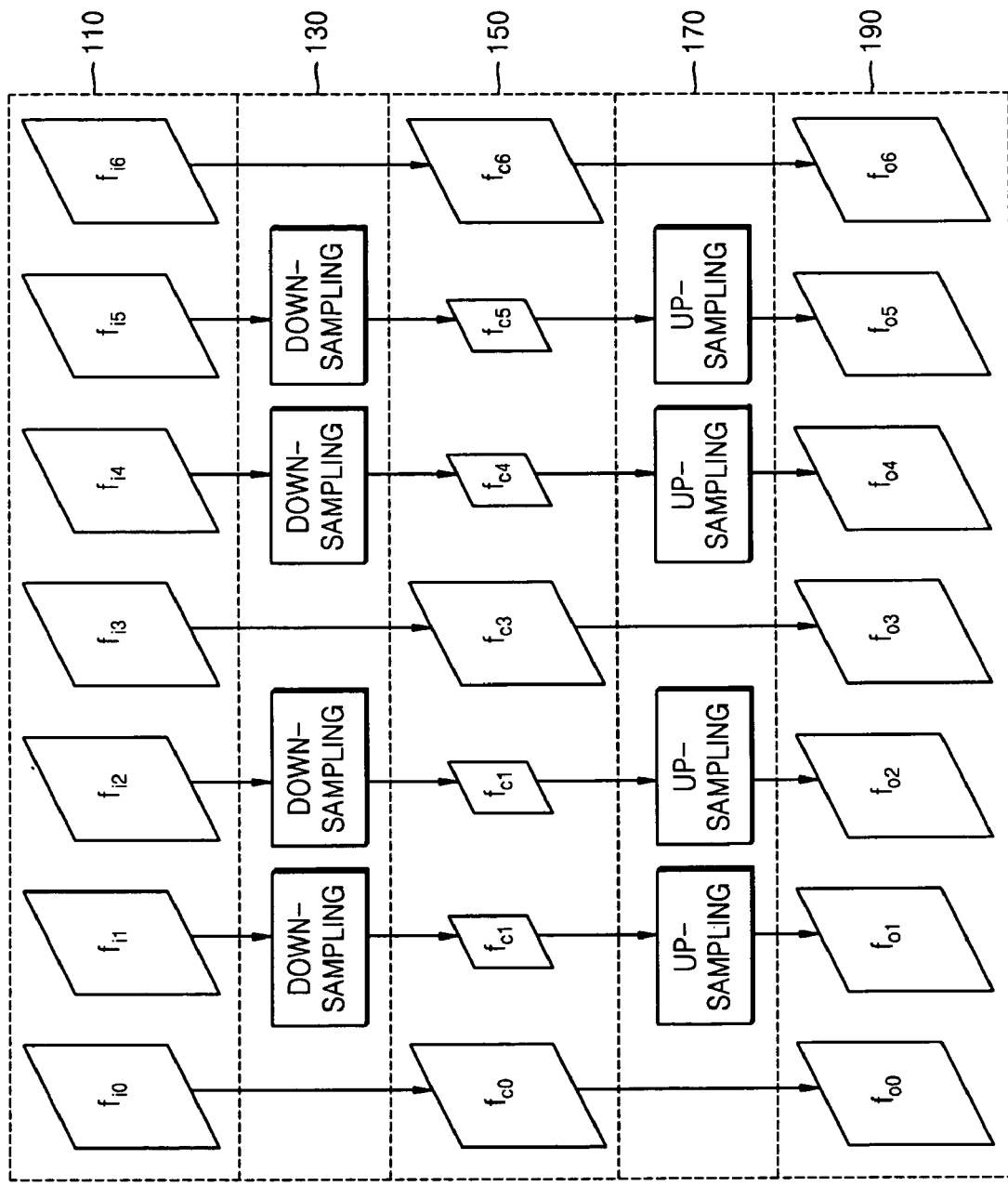
FIG. 1 illustrates the concept of video encoding and decoding according to embodiments of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates the concept of video encoding and decoding according to embodiments of the present invention. Referring to FIG. 1, when a video sequence composed of a plurality of frames having a first resolution is input (S110), some of the frames of the video sequence are down-sampled (S130). According to down-sampling, frames having the first resolution are converted into frames having a second resolution, and the video sequence composed of a plurality of frames having the first resolution and a plurality of frames having the second resolution is encoded (S150). Accordingly, a bitstream including data encoded in at least two resolutions is generated.

When a system including both a video encoding apparatus and a video decoding apparatus displays a reconstructed image on a screen, the encoded data is decoded, and then the frames having the second resolution are up-sampled (S170). According to up-sampling, the frames having the second resolution are converted into frames having the first resolution, and a reconstructed video sequence in which all the frames have the first resolution is displayed on the screen (S190).

Figure 2A:
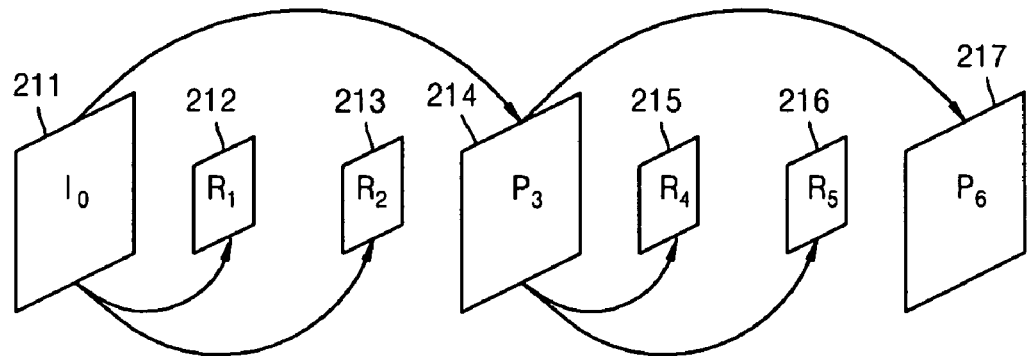
FIGS. 2A and 2B illustrate a method of estimating a motion between frames having different resolutions.
Figure 2B:
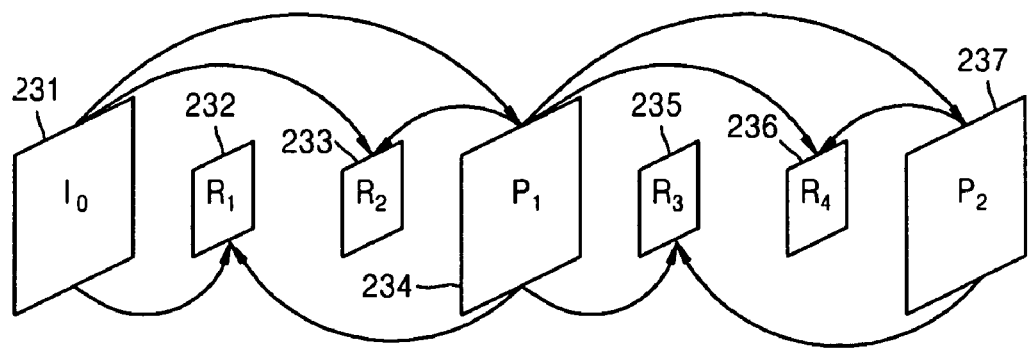

FIGS. 2A and 2B illustrate a method of estimating a motion between frames having different resolutions. FIG. 2A illustrates an IP video sequence and FIG. 2B illustrates an IBP video sequence.

Referring to FIG. 2A, two P-frames 212 and 213 following an I-frame 211 having a first resolution have a second resolution lower than the first resolution. Unidirectional motion estimation is performed on the P-frames 212 and 213 having the second resolution and a P-frame 214 having the first resolution using the I-frame 211 as a reference frame. Two P-frames 215 and 216 following the P-frame 214 having the first resolution have the second resolution. Unidirectional motion estimation is performed on the P-frames 215 and 216 having the second resolution and a P-frame 217 having the first resolution using the P-frame 214 as a reference frame.

Referring to FIG. 2B, two B-frames 232 and 233 following an I-frame 231 having a first resolution have a second resolution lower than the first resolution. Bidirectional motion estimation is carried out on the two B-frames 232 and 233 having the second resolution using the I-frame 231 and a P-frame 234 having the first resolution as reference frames. Unidirectional motion estimation is performed on the P-frame 234 having the first resolution using the I-frame 231 as a reference frame. Two B-frames 235 and 236 following the P-frame 234 having the first resolution have the second resolution. Bidirectional motion estimation is performed on the B-frames 235 and 236 having the second resolution using the P-frame 234 and a P-frame 237 having the first resolution as reference frames. Unidirectional motion estimation is carried out on the P-frame 237 having the first resolution using the P-frame 234 as a reference frame.

Figure 3A:
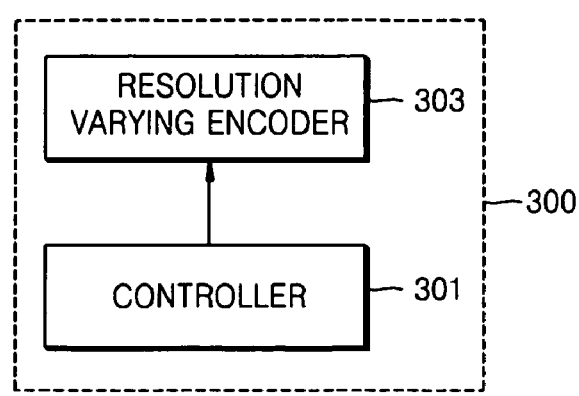
FIGS. 3A, 3B and 3C are block diagrams illustrating configurations of video encoding apparatuses according to embodiments of the present invention.
Figure 3B:
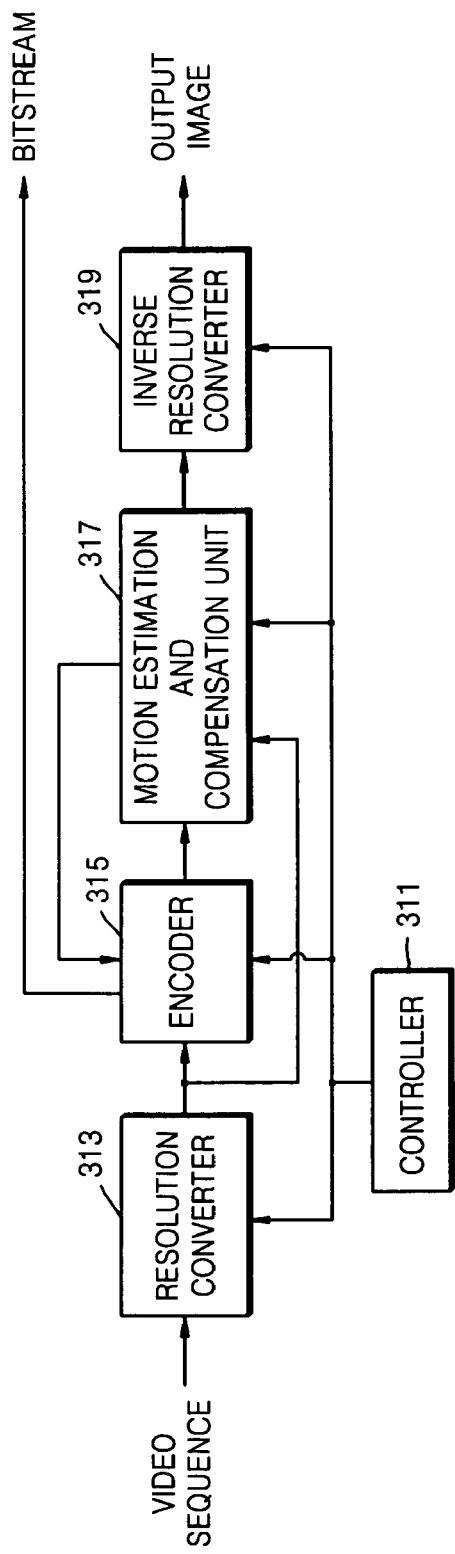
Figure 3C:
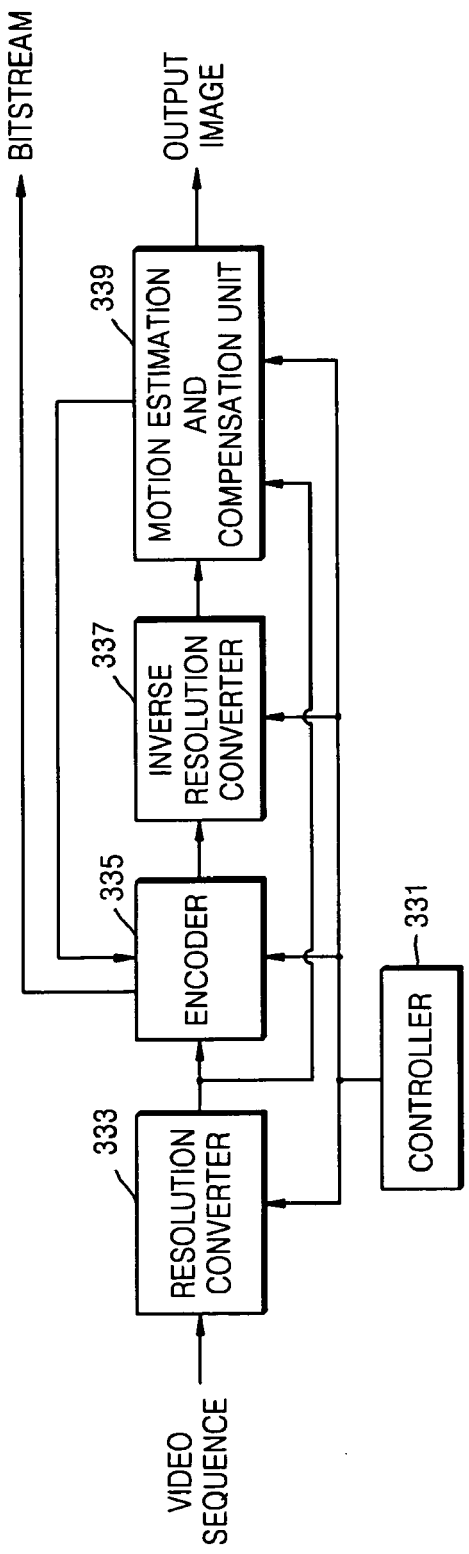

FIGS. 3A, 3B and 3C are block diagrams illustrating configurations of video encoding apparatuses according to embodiments of the present invention. The video encoding apparatus illustrated in FIG. 3A includes a controller 301 and a resolution varying encoder 303. The controller 301 and the resolution varying encoder 303 can be integrated into a single processor 300.

Referring to FIG. 3A, the controller 301 controls the overall encoding operation. Specifically, the controller 301 controls the resolution varying encoder 303 to encode an input current image in one of a first resolution corresponding to the original resolution of the current image and a second resolution lower than the first resolution. Here, a resolution can correspond to one of a spatial resolution and a bit resolution.

The resolution varying encoder 303 encodes the current image with the first resolution or the second resolution in synchronization with a resolution control signal provided by the controller 301 and generates a bitstream composed of encoded data corresponding to frames encoded with the first resolution and encoded data corresponding to frames encoded with the second resolution.

The video encoding apparatus illustrated in FIG. 3B decreases the resolution of a video sequence from a first resolution to a second resolution at a predetermined interval, performs motion estimation on a current frame image (referred to as a current image) having the second resolution between the first resolution and the second resolution, and carries out motion compensation on the current image with the second resolution. Although the predetermined interval can be determined such that the resolution of B-frames is decreased in the case of an IBP video sequence, it is not limited thereto. In the case of an IP video sequence, the predetermined interval can be determined such that the ratio of the original resolution to the decreased resolution is 1:2. However, it is not limited thereto. The video encoding apparatus illustrated in FIG. 3B includes a controller 311, a resolution converter 313, an encoder 315, a motion estimation and compensation unit 317, and an inverse resolution converter 319. These components can be integrated into at least one functional module if required.

Referring to FIG. 3B, the controller 311 corresponds to the controller 301 illustrated in FIG. 3A, controls the overall encoding process and generates a resolution control signal. The resolution converter 313 outputs the first-resolution current image of the video sequence as it is or converts the first-resolution current image into a second-resolution current image and outputs the second-resolution current image at a predetermined interval in response to the resolution control signal. The first-resolution current image or the second-resolution current image is provided to the encoder 315 and the motion estimation and compensation unit 317.

The encoder 315 generates a residue signal between the first-resolution current image provides by the resolution converter 313 and a first-resolution motion-compensated image with respect to a reconstructed image of a first-resolution previous frame (referred to as a previous reconstructed image) and performs discrete cosine transform (DCT), quantization and entropy coding on the residue signal to generate encoded data of a frame having the first resolution. Furthermore, the encoder 315 generates a residue signal between the second-resolution current image provided by the resolution converter 313 and a second-resolution motion-compensated image with respect to the first-resolution previous reconstructed image and performs discrete cosine transform, quantization and entropy coding on the residue signal to generate encoded data of a frame having the second resolution. Data generated after the quantization is referred to as intermediate encoded data and data generated after the entropy coding is referred to as final encoded data in the current embodiment of the present invention. The final encoded data having the first resolution and the final encoded data having the second resolution are combined to generate a bitstream.

The motion estimation and compensation unit 317 performs inverse quantization and inverse discrete cosine transform on the intermediate encoded data having the first resolution or the second resolution to generate intermediate decoded data. The motion estimation and compensation unit 317 carries out motion estimation and compensation on the first-resolution current image using the first-resolution previous reconstructed image as a reference image to generate the first-resolution motion-compensated image. Furthermore, the motion estimation and compensation unit 317 performs motion estimation on the second-resolution current image using the first-resolution previous reconstructed image as a reference image and carries out motion compensation on the second-resolution current image to generate the second-resolution motion-compensated image. The first-resolution motion-compensated image or the second-resolution motion-compensated image is provided to the encoder 315. The motion estimation and compensation unit 317 sums up first-resolution intermediate decoded data and the first-resolution motion-compensated image to generate first-resolution final decoded data or sums up second-resolution intermediate decoded data and the second-resolution motion-compensated image to generate second-resolution final decoded data. The first-resolution final decoded data or the second-resolution final decoded data is stored to be used as a reference image. It is preferable to store the first-resolution final decoded data.

The inverse resolution converter 319 outputs the first-resolution final decoded data as it is and inversely converts the resolution of the second-resolution final decoded data so as to output the first-resolution final decoded data in response to the resolution control signal. The final decoded data output from the inverse resolution converter 319 is provided to a display (not shown) as an output image.

A resolution flag can be included in the outputs of the encoder 315, the motion estimation and compensation unit 317 and the inverse resolution converter 319. In this case, components following the inverse resolution converter 319 can perform a dual process with reference to the resolution flag. The resolution flag can be included in at least one of a sequence header, a group-of-pictures (GOP) header, a picture header and a frame or field header when a bitstream is constituted.

The video encoding apparatus illustrated in FIG. 3C decreases the resolution of images of a video sequence from the first resolution to the second resolution at a predetermined interval, performs motion estimation on a second-resolution current image between the first resolution and the second resolution and carries out motion compensation on the current image with the first resolution. The video encoding apparatus illustrated in FIG. 3C includes a controller 331, a resolution converter 333, an encoder 335, an inverse resolution converter 337 and a motion estimation and compensation unit 339. These components can be integrated into at least one functional module if required. The controller 331, the resolution converter 333 and the encoder 335 perform the same functions as those of the controller 311, the resolution converter 313 and the encoder 315 so that explanations thereof are omitted.

The inverse resolution converter 337 performs inverse quantization and inverse discrete cosine transform on first-resolution intermediate encoded data or second-resolution intermediate encoded data generated by the encoder 335 to generate intermediate decoded data. The inverse resolution converter 337 outputs first-resolution intermediate decoded data as it is and converts the resolution of second-resolution intermediate decoded data so as to output first-resolution intermediate decoded data in response to a resolution control signal. The first-resolution intermediate decoded data output from the inverse resolution converter 337 is provided to the motion estimation and compensation unit 339.

The motion estimation and compensation unit 339 performs motion estimation and compensation on the intermediate decoded data provided by the inverse resolution converter 337 to generate a motion-compensated image. The motion estimation and compensation unit 339 carries out motion estimation and compensation on the first-resolution current image using a first-resolution previous reconstructed image as a reference image to generate a first-resolution motion-compensated image. The motion estimation and compensation unit 339 performs motion estimation on the second-resolution current image using the first-resolution previous reconstructed image as a reference image, carries out motion compensation on the current image with the first resolution to generate a first-resolution motion-compensated image and down-samples or sub-samples the first-resolution motion-compensated image to generate a second-resolution motion-compensated image. The first-resolution motion-compensated image or the second-resolution motion-compensated image is provided to the encoder 335. The motion estimation and compensation unit 339 sums up the first-resolution intermediate decoded data and the first-resolution motion-compensated image for the first-resolution current image to generate first-resolution final decoded data. The motion estimation and compensation unit 339 sums up the first-resolution intermediate decoded data and the first-resolution motion-compensated image for the second-resolution current image to generate first-resolution final decoded data. The first-resolution current image and the second-resolution current image are stored in order to generate the first-resolution final decoded data and use the final decoded data as a reference image. It is preferable to store final decoded data with respect to the first-resolution current image.

Figure 4A:
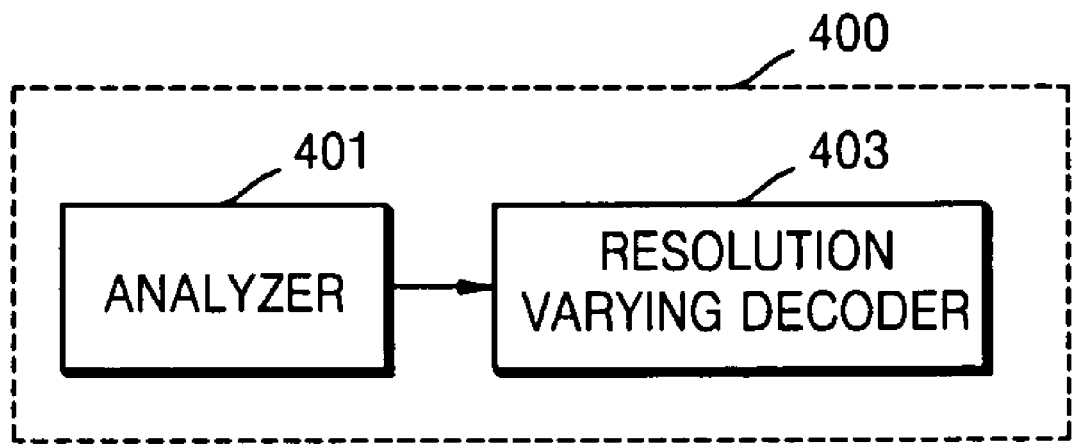
FIGS. 4A, 4B and 4C are block diagrams illustrating configurations of video decoding apparatuses according to embodiments of the present invention.
Figure 4B:
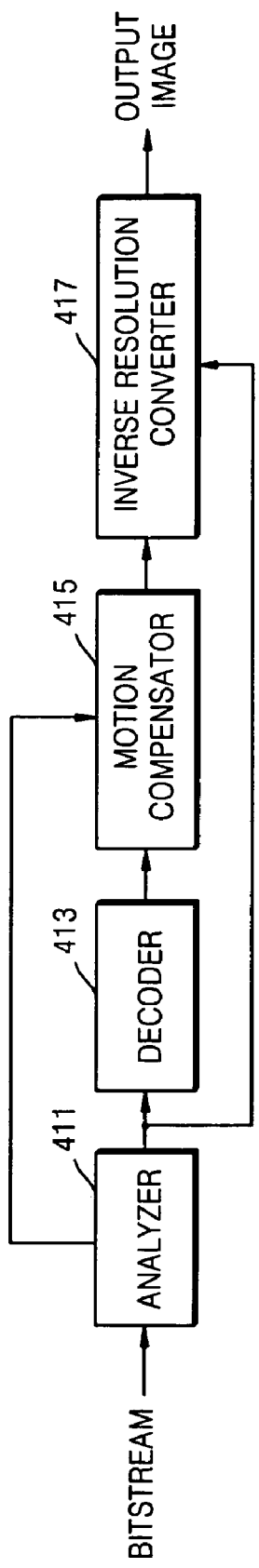
Figure 4C:
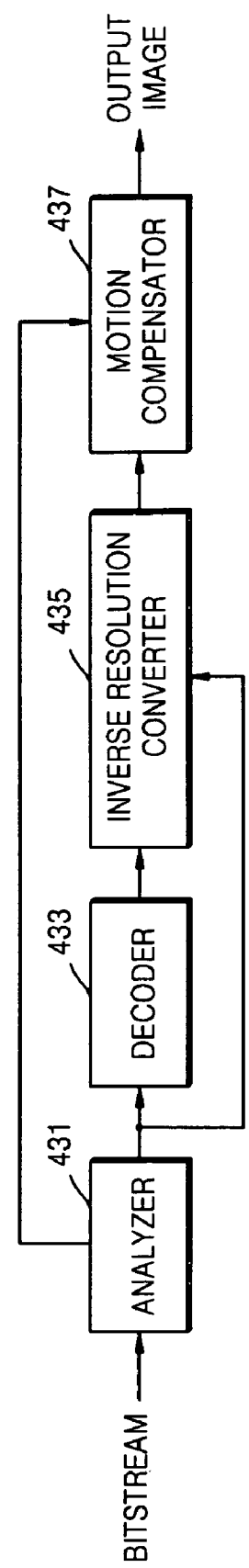

FIGS. 4A, 4B and 4C are block diagrams illustrating configurations of video decoding apparatuses according to embodiments of the present invention. The video decoding apparatus illustrated in FIG. 4A includes an analyzer 401 and a resolution varying decoder 403. The analyzer 401 and the resolution varying decoder 403 can be integrated into a single processor 400.

Referring to FIG. 4A, the analyzer 401 analyzes a received bitstream, determines whether the bitstream corresponds to first-resolution encoded data or second-resolution encoded data with reference to a resolution flag included in the bitstream and outputs a resolution control signal according to the determination result. That is, the analyzer 401 controls the overall decoding operation and, particularly, the operation of the resolution varying decoder 403 to perform a dual decoding process for the first resolution and the second resolution on the first-resolution encoded data or the second-resolution encoded data included in the bitstream.

The resolution varying decoder 403 decodes the first-resolution encoded data with the first resolution and decodes the second-resolution encoded data with the second resolution to generate an output image according to the decoding result in synchronization with the resolution control signal provided by the analyzer 401.

The video decoding apparatus illustrated in FIG. 4B corresponds to the video encoding apparatus illustrated in FIG. 3B and includes an analyzer 411, a decoder 413, a motion compensator 415 and an inverse resolution converter 417. These components can be integrated into at least one functional module if required.

Referring to FIG. 4B, the analyzer 411 corresponds to the analyzer 401 illustrated in FIG. 4A, controls the overall decoding operation and generates a resolution control signal. The decoder 413 performs entropy decoding, inverse quantization and inverse discrete cosine transform on first-resolution encoded data or second-resolution encoded data in response to the resolution control signal and outputs first-resolution intermediate decoded data or second-resolution intermediate decoded data.

The motion compensator 415 performs motion compensation using a motion vector and a previous reconstructed image provided by the analyzer 411 in response to the resolution control signal to generate a first-resolution motion-reconstructed image or second-resolution motion-reconstructed image. The motion compensator 415 sums up the first-resolution intermediate decoded data or the second-resolution intermediate decoded data and the first-resolution motion-reconstructed image or the second-resolution motion-reconstructed image to generate first-resolution final decoded data or second-resolution final decoded data.

The inverse resolution converter 417 outputs the first-resolution final decoded data as it is, and converts the resolution of the second-resolution final decoded data so as to outputs first-resolution final decoded data in response to the resolution control signal.

The video decoding apparatus illustrated in FIG. 4C corresponds to the video encoding apparatus illustrated in FIG. 3C and includes an analyzer 431, a decoder 433, an inverse resolution converter 435 and a motion compensator 437. These components can be integrated into at least one functional module if required. The analyzer 431 and the decoder 433 have the same functions as those of the analyzer 411 and the decoder 413 illustrated in FIG. 4B so that explanations thereof are omitted.

Referring to FIG. 4C, the inverse resolution converter 435 outputs first-resolution intermediate decoded data as it is, converts the resolution of second-resolution intermediate decoded data so as to output first-resolution intermediate decoded data in response to the resolution control signal.

The motion compensator 437 performs motion compensation using a motion vector and a previous reconstructed image provided by the analyzer 431 to generate a first-resolution motion-reconstructed image for the first-resolution intermediate decoded data with respect to first-resolution encoded data and the first-resolution intermediate decoded data with respect to second-resolution encoded data provided by the inverse resolution converter 435. The motion compensator 437 respectively adds the first-resolution motion-reconstructed image to the first-resolution intermediate decoded data with respect to the first-resolution encoded data and the first-resolution intermediate decoded data with respect to the second-resolution encoded data to generate first-resolution final decoded data.

Figure 5A:
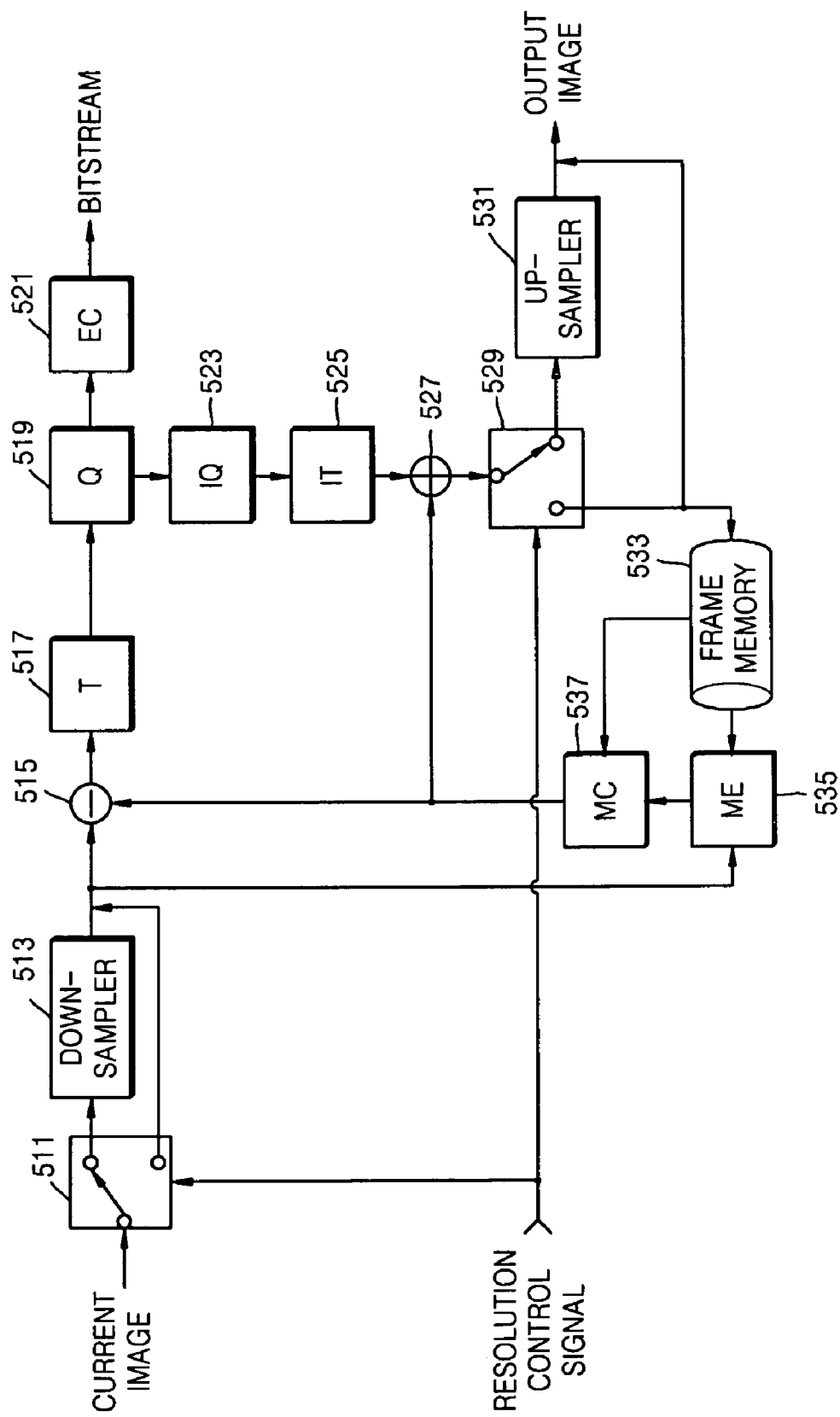
FIG. 5A illustrates a video encoding apparatus according to an embodiment of the present invention in detail.
Figure 5B:
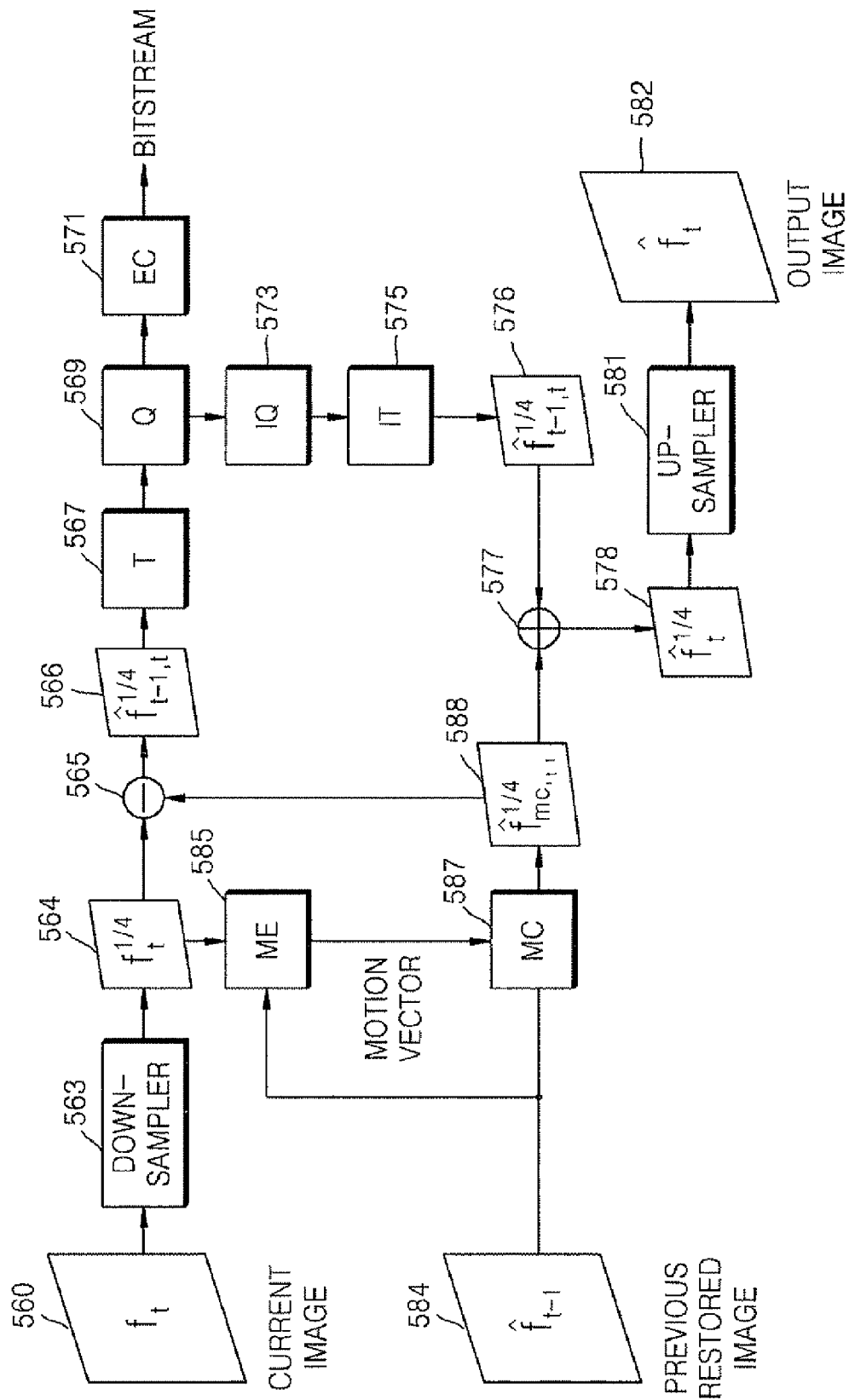
FIG. 5B illustrates an encoding operation performed by the video encoding apparatus illustrated in FIG. 5A.

FIG. 5A illustrates a video encoding apparatus according to an embodiment of the present invention when a spatial resolution is varied between a first resolution and a second resolution and FIG. 5B illustrates an operation of encoding a current image changed to a second-resolution image according to an embodiment of the present invention.

Referring to FIG. 5A, the video encoding apparatus includes a switch 511, a down-sampler 513, a subtracter 515, a transformer 517, a quantizer 519, an entropy coder 521, an inverse quantizer 523, an inverse transformer 525, a summer 527, a switch 529, an up-sampler 531, a frame memory 533, a motion estimator 535 and a motion compensator 537. The components other than the switch 511, the down-sampler 513, the switch 529 and the up-sampler 531 are identical to those of a conventional video encoding apparatus using motion compensation and detailed explanations thereof are omitted.

The switch 511 operates according to a resolution control signal and provides a first-resolution current image input thereto to the down-sampler 513 or the subtracter 515. The down-sampler 513 down-samples the first-resolution current image to generate a second-resolution current image and provides the second-resolution current image to the subtracter 515.

The switch 529 operates according to the resolution control signal, provides first-resolution final decoded data received from the summer 527 to the frame memory 533 and, simultaneously, outputs the first-resolution final decoded data as an output image. Furthermore, the switch 529 provides second-resolution final decoded data received from the summer 527 to the up-sampler 531. The up-sampler 531 up-samples the second-resolution final decoded data received from the switch 529 to generate first-resolution final decoded data and provides the first-resolution final decoded data as an output image.

Referring to FIG. 5B, a down-sampler 563 down-samples a first-resolution current image 560 to provide a second-resolution current image 564. A subtracter 565 generates a second-resolution residue image 566 between the second-resolution current image 564 and a second-resolution motion-compensated image 588 from a previous reference image. A transformer 567 transforms the residue image 566 from a time domain into a frequency domain and generates a transform coefficient. A quantizer 569 quantizes the transform coefficient and an entropy coder 571 entropy-codes the quantized transform coefficient. An inverse quantizer 573 inversely quantizes the quantized transform coefficient to restore the transform coefficient. An inverse transformer 575 inversely transforms the reconstructed transform coefficient to reconstruct the second-resolution residue image 576. A summer 577 sums up the reconstructed second-resolution residue image 576 and the second-resolution motion-compensated image 588 from the previous reference image to generate a second-resolution reconstructed image 578. An up-sampler 581 up-samples the second-resolution reconstructed image 578 to produce a first-resolution final reconstructed image 582.

A motion estimator 585 performs motion estimation on the second-resolution current image 564 with reference to a first-resolution previous reconstructed image 584 and a motion compensator 587 performs motion compensation with the second resolution to provide the second-resolution motion-compensated image 588.

In FIG. 5B, $f_t$ denotes the first-resolution current image 560 at a time t, $f_t^{1/4}$ denotes a current image having a resolution corresponding to a quarter of the original resolution, that is, the second-resolution current image 564, $\hat{f}_{t-1}$ denotes the first-resolution previous reconstructed image 584 at a time t−1, $\hat{f}_{mc,t-1}^{1/4}$ denotes the motion-compensated image 588 from the previous reference image, $f_{t,t-1}^{1/4}$ represents the residue image 566 corresponding to a difference between $f_t^{1/4}$ and $\hat{f}_{mc,t-1}^{1/4}$, $\hat{f}_{t,t-1}^{1/4}$ represents the reconstructed residue image 576, $\hat{f}_t^{1/4}$ represents a final reconstructed image having a decreased resolution, that is, the second-resolution final reconstructed image 578, and $\hat{f}_t$ represents the reconstructed image 582 having the original resolution, that is, the first resolution.

Figure 6:
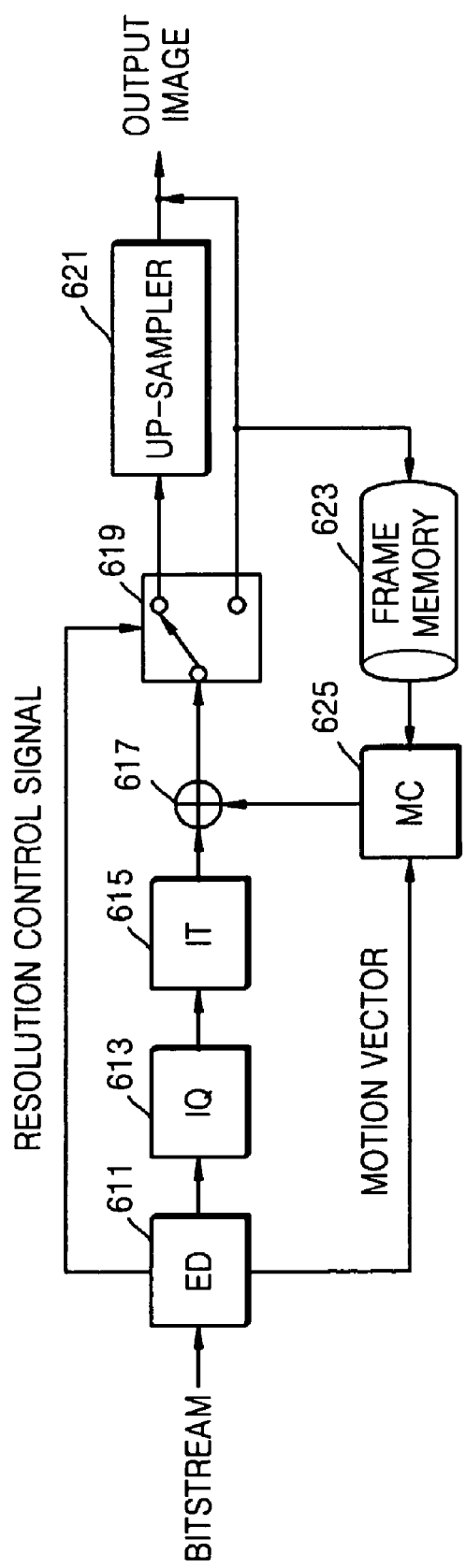
FIG. 6 illustrates a video decoding apparatus according to an embodiment of the present invention in detail.

FIG. 6 illustrates a video decoding apparatus according to an embodiment of the present invention. Referring to FIG. 6, the video decoding apparatus includes an entropy decoder 611, an inverse quantizer 613, an inverse transformer 615, a summer 617, a switch 619, an up-sampler 621, a frame memory 623, and a motion compensator 625. The components other than the switch 619 and the up-sampler 621 are identical to those of a conventional video decoding apparatus using motion compensation so that detailed explanations thereof are omitted.

The switch 619 operates according to a resolution control signal, provides first-resolution final decoded data received from the summer 617 to the frame memory 623 and outputs the first-resolution final decoded data as an output image. The switch 619 provides second-resolution final decoded data received from the summer 617 to the up-sampler 621. The up-sampler 621 up-samples the second-resolution final decoded data provided through the switch 619 to generate first-resolution final decoded data and provides the first-resolution final decoded data as an output image.

Figure 7A:
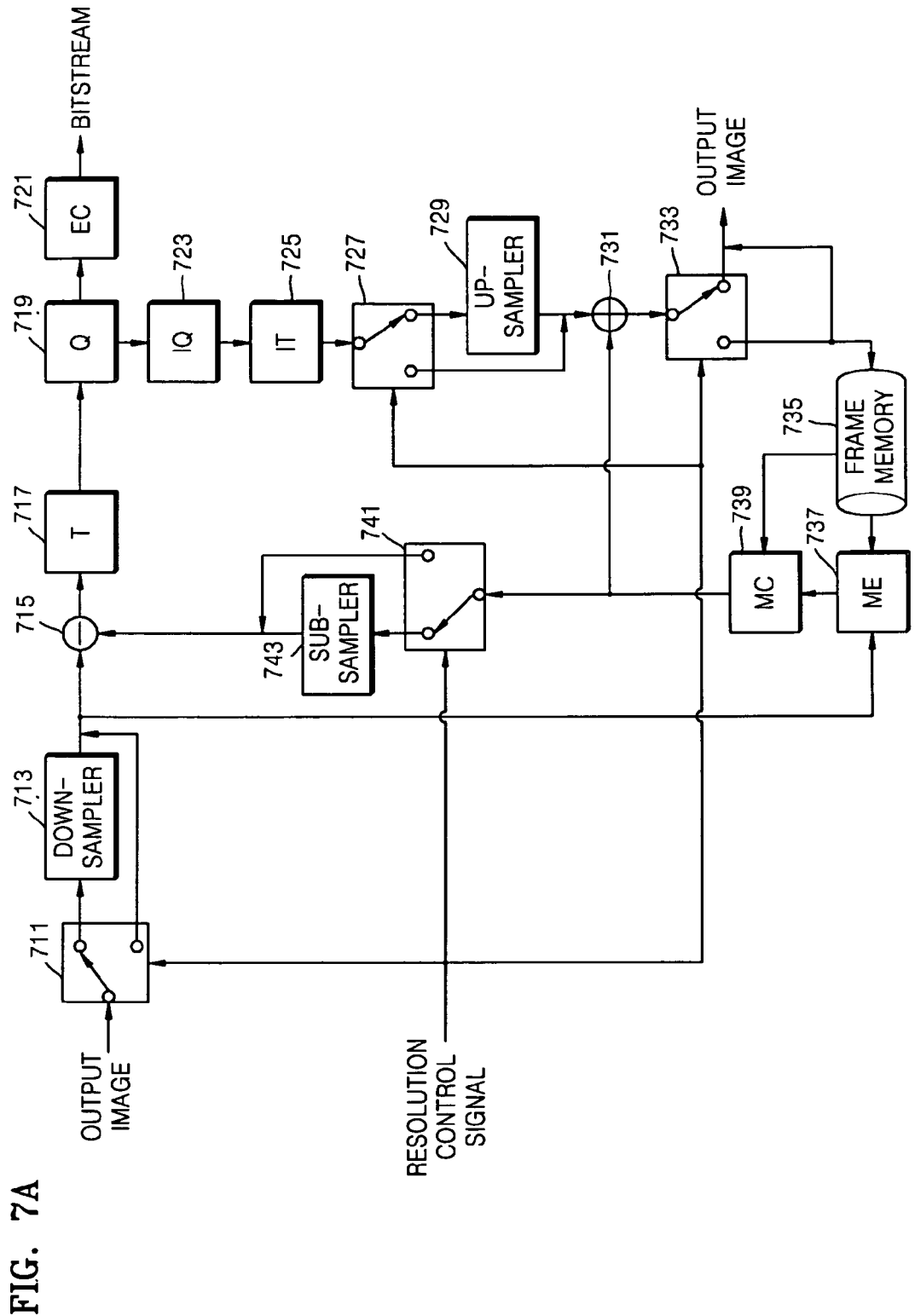
FIG. 7A illustrates a video encoding apparatus according to another embodiment of the present invention in detail.
Figure 7B:
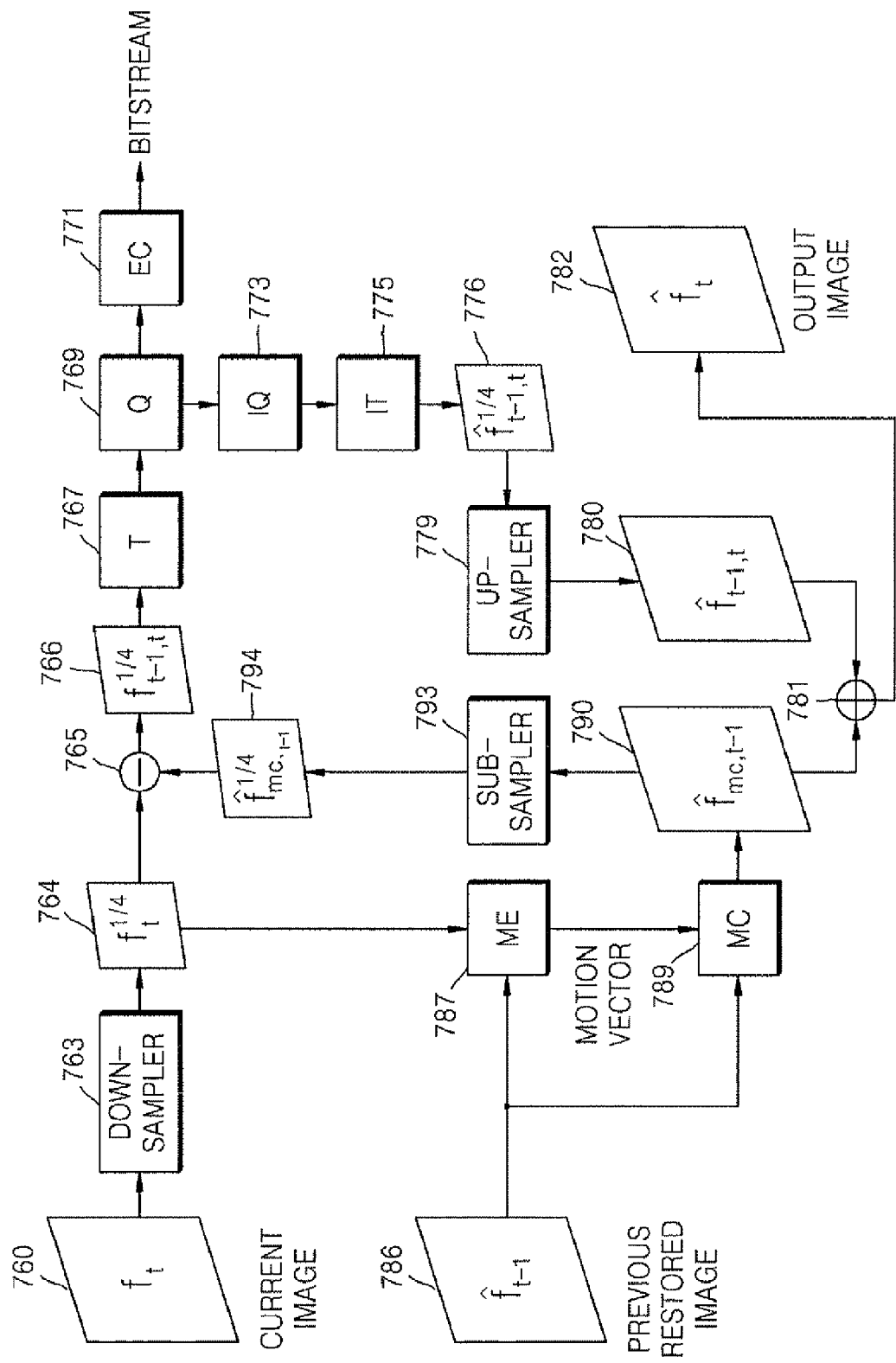
FIG. 7B illustrates a video encoding operation performed by the video encoding apparatus illustrated in FIG. 7A.

FIG. 7A illustrates a video encoding apparatus according to another embodiment of the present invention when a spatial resolution is varied between a first resolution and a second resolution and FIG. 7B illustrates an operation of encoding a current image changed to a second-resolution image according to another embodiment of the present invention.

Referring to FIG. 7A, the video encoding apparatus includes a switch 711, a down-sampler 713, a subtracter 715, a transformer 717, a quantizer 719, an entropy coder 721, an inverse quantizer 723, an inverse transformer 725, a switch 727, an up-sampler 729, a summer 731, a switch 733, a frame memory 735, a motion estimator 737, a motion compensator 739, a switch 741 and a sub-sampler 743. The components other than the switch 711, the down-sampler 713, the switch 727, the up-sampler 531, the switch 733, the switch 741 and the sub-sampler 743 are identical to those of a conventional video encoding apparatus using motion compensation and detailed explanations thereof are omitted.

The switch 711 operates according to a resolution control signal and provides a first-resolution current image input thereto to the down-sampler 713 or the subtracter 715. The down-sampler 713 down-samples the first-resolution current image to generate a second-resolution current image and provides the second-resolution current image to the subtracter 715.

The switch 727 operates according to the resolution control signal, provides a first-resolution reconstructed residue image input from the inverse transformer 725 to the summer 731 and provides a second-resolution reconstructed residue image input from the inverse transformer 725 to the up-sampler 729. The up-sampler 729 up-samples the second-resolution reconstructed residue image provided through the switch 727 to generate a first-resolution reconstructed residue image and provides the first-resolution reconstructed residue image to the summer 731.

The switch 733 operates according to the resolution control signal, stores a reconstructed image provided by the summer 731 in the frame memory 735 and, simultaneously, provides the reconstructed image as an output image. Otherwise, the switch 733 provides the reconstructed image as the output image without storing the reconstructed image in the frame memory 735.

The switch 741 operates according to the resolution control signal provides a first-resolution motion-compensated image from a previous reference image to the sub-sampler 743 or the subtracter 715. The sub-sampler 743 sub-samples the first-resolution motion-compensated image provided through the switch 741 to generate a second-resolution motion-compensated image and provides the second-resolution motion-compensated image to the subtracter 715.

Referring to FIG. 7B, a down-sampler 763 down-samples a first-resolution current image 760 to provide a second-resolution current image 764. A subtracter 765 generates a second-resolution residue image 766 between the second-resolution current image 764 and a second-resolution motion-compensated image 794 from a previous reference image. A transformer 767 transforms the second-resolution residue image 766 from a time domain into a frequency domain and generates a transform coefficient. A quantizer 769 quantizes the transform coefficient and an entropy coder 771 entropy-codes the quantized transform coefficient. An inverse quantizer 773 inversely quantizes the quantized transform coefficient to restore the transform coefficient. An inverse transformer 775 inversely transforms the reconstructed transform coefficient to reconstruct the second-resolution residue image 776. An up-sampler 779 up-samples the reconstructed second-resolution residue image 776 to generate a reconstructed first-resolution residue image 780. A summer 781 sums up the reconstructed first-resolution residue image 780 and a first-resolution motion-compensated image 790 from a previous reference image to generate a first-resolution reconstructed image 782.

A motion estimator 787 performs motion estimation on the second-resolution current image 764 with reference to a first-resolution previous reconstructed image 786 and a motion compensator 789 performs motion compensation with first second resolution to provide the first-resolution motion-compensated image 790.

In FIG. 7B, $\hat{f}_{mc,t-1}$ denotes the first-resolution motion-compensated image 790 from the previous reference image, $\hat{f}_{mc,t-1}^{1/4}$ denotes the second-resolution motion-compensated image 794 converted from $\hat{f}_{mc,t-1}$, and $\hat{f}_{t-1,t}$ represents the first-resolution reconstructed residue image 780.

Figure 8:
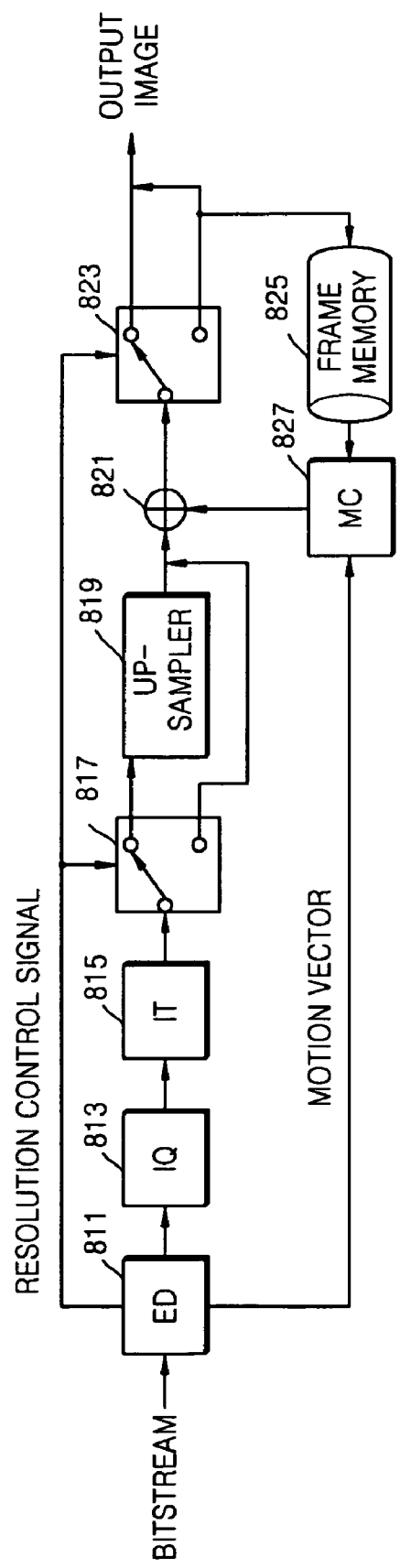
FIG. 8 illustrates a video decoding apparatus according to another embodiment of the present invention in detail.

FIG. 8 illustrates a video decoding apparatus according to another embodiment of the present invention. Referring to FIG. 8, the video decoding apparatus includes an entropy decoder 811, an inverse quantizer 813, an inverse transformer 815, a switch 817, an up-sampler 819, a summer 821, a switch 823, a frame memory 825 and a motion compensator 827. The components other than the switch 817, the up-sampler 819 and the switch 823 are identical to those of a conventional video decoding apparatus using motion compensation so that detailed explanations thereof are omitted.

The switch 819 operates according to a resolution control signal and respectively provides a second-resolution reconstructed residue image and a first-resolution reconstructed residue image received from the inverse transformer 815 to the up-sampler 819 and the summer 821. The up-sampler 819 up-samples the second-resolution reconstructed residue image provided through the switch 819 to generate a first-resolution reconstructed residue image and provides the first-resolution reconstructed residue image to the summer 821.

The switch 823 operates according to the resolution control signal, provides first-resolution final decoded data received from the summer 821 to the frame memory 825 and, simultaneously, provides the first-resolution final decoded data as an output image. Otherwise, the switch 823 outputs the first-resolution final decoded data as the output image without providing it to the frame memory 825.

Figure 9A:
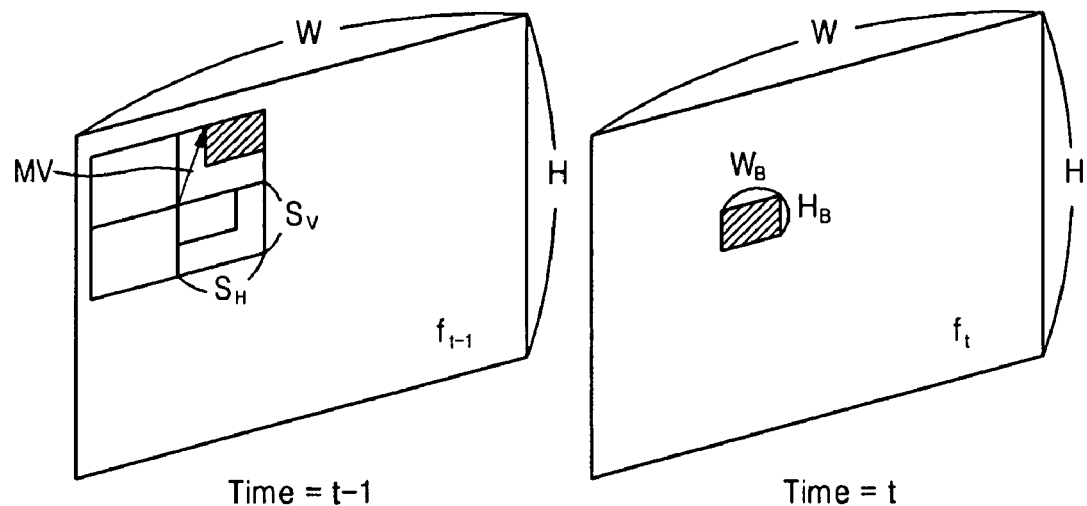
FIGS. 9A and 9B illustrate a motion estimation method when a current image and a reference image have the same resolution.

FIG. 9A illustrates an example of a motion vector searching operation performed for each integer pixel. An integer motion vector MV having a minimum SAD (Sum of Absolute Difference) is obtained according to Equations 1, 2 and 3.

$$SAD(p, q) = \sum_{i=0}^{W_B} \sum_{j=0}^{H_B} |f_t(i, j) - f_{t-1}(i + p, j + q)| \quad \text{[Equation 1]}$$

$$MV = \{mvx, mvy\} = \underset{(p,q)\in\Omega}{\mathrm{argmin}}(SAD(p, q)) \quad \text{[Equation 2]}$$

$$\Omega = [(p, q) | -S_h \le p \le S_h, -S_v \le q \le S_v] \quad \text{[Equation 3]}$$

In FIG. 9A and Equations 1, 2 and 3, $W_B$ and $H_B$ respectively denote horizontal and vertical block sizes in a current image, Ω denotes an integer motion search region in horizontal and vertical directions in a previous reference image, $S_H$ and $S_V$ respectively represents integer horizontal and vertical motion search region sizes in the previous reference image, p and q respectively represent horizontal and vertical motion vector candidates, and W and H respectively denotes horizontal and vertical sizes of an input image.

Figure 9B:
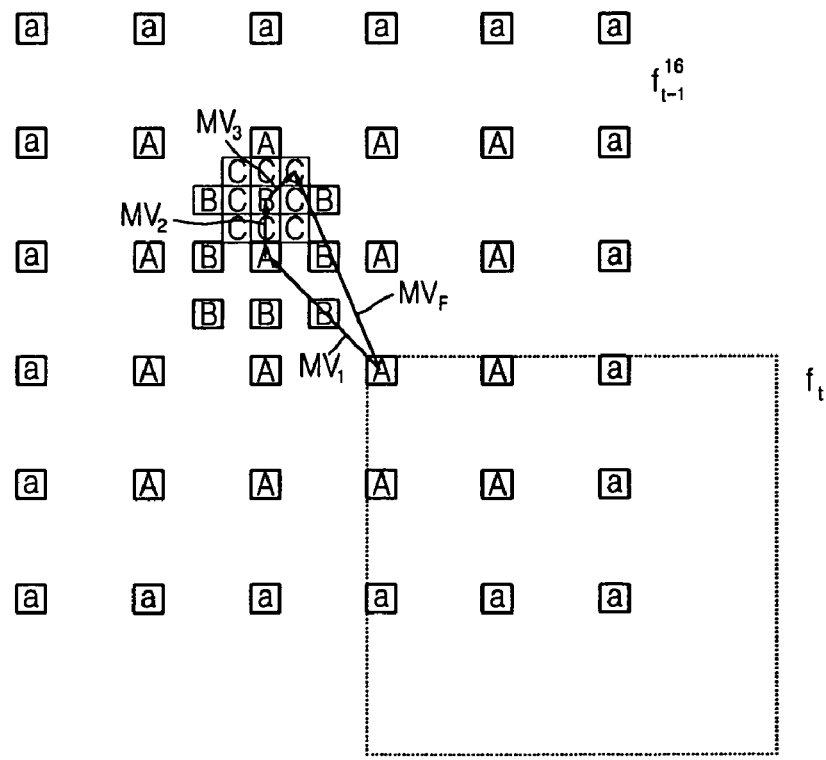

FIG. 9B illustrates an example of a motion vector searching operation performed for each quarter pixel. The integer motion vector MV obtained according to Equation 1 is scaled for every four pixels in order to represent a motion by quarter pixels in a reference image $f_{t-1}^{16}$ having a resolution corresponding to sixteen times of the resolution of a reference image $f_{t-1}$, that is, horizontal four times and vertical four times of the resolution of a reference image $f_{t-1}$, as represented by Equation 4.

$$MV_1 = (mvx_1, mvy_1) = 4 \cdot MV = (4mvx, 4mvy) \quad \text{[Equation 4]}$$

A motion searching operation performed for each half pixel obtains a motion vector having a minimum SAD according to Equations 5, 6 and 7.

$$SAD_{\frac{1}{2}}(p, q) = \sum_{i=0}^{W_B} \sum_{j=0}^{H_B} |f_t(i, j) - f_{t-1}^{16}(4i + p, 4j + q)| \quad \text{[Equation 5]}$$

$$MV_2 + \{mvx_2, mvy_2\} = \underset{(p,q)\in\Omega_{\frac{1}{4}}}{\mathrm{argmin}}(SAD_{\frac{1}{2}}(p, q)) \quad \text{[Equation 6]}$$

$$\Omega_{\frac{1}{2}} = \left\{(p, q) \middle| -1 \le \frac{(p - mvx_1)}{2} < 1, -1 \le \frac{(q - mvy_1)}{2} < 1\right\} \quad \text{[Equation 7]}$$

The motion searching operation carried out for each quarter pixel obtains a motion vector having a minimum SAD according to Equations 8, 9 and 10.

$$SAD_{\frac{1}{4}}(p, q) = \sum_{i=0}^{W_B} \sum_{j=0}^{H_B} |f_t(i, j) - f_{t-1}^{16}(4i + p, 4j + q)| \quad \text{[Equation 8]}$$

$$MV_3 + \{mvx_3, mvy_3\} = \underset{(p,q)\in\Omega_{\frac{1}{4}}}{\mathrm{argmin}}(SAD_{\frac{1}{4}}(p, q)) \quad \text{[Equation 9]}$$

$$\Omega_{\frac{1}{4}} = \{(p, q) | -1 \le (p - mvx_2) < 1, -1 \le (q - mvy_2) < 1\} \quad \text{[Equation 10]}$$

A final motion vector by quarter pixels can be represented as follows according to Equations 4, 6 and 9.

$$MV_F = MV_1 + MV_2 + MV_3 \quad \text{[Equation 11]}$$

Figure 10A:
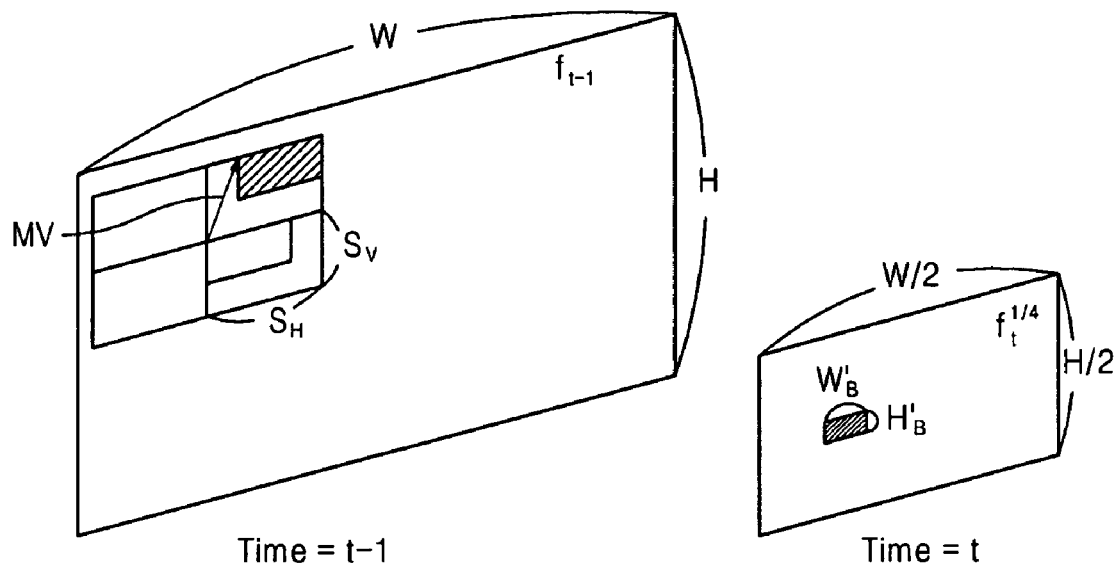
FIGS. 10A and 10B illustrate a motion estimation method when the resolution of a reference image is higher than the resolution of a current image.

FIG. 10A illustrates an example of a motion vector searching operation performed for every half pixel. The resolution of an input image $f_t^{1/4}$ corresponds to a quarter of the resolution of a reference image $f_{t-1}$, and thus a motion vector is represented by half pixels even though the resolution of the reference image is not varied. A motion vector MV by integer pixels and half pixels, which has a minimum SAD, is obtained according to Equations 12, 13 and 14.

$$SAD(p, q) = \sum_{i=0}^{W_B} \sum_{j=0}^{H_B} |f_t^{\frac{1}{4}}(i, j) - f_{t-1}(2i + p, 2j + q)| \quad \text{[Equation 12]}$$

$$MV + \{mvx, mvy\} = \underset{(p,q)\in\Omega}{\mathrm{argmin}}(SAD(p, q)) \quad \text{[Equation 13]}$$

$$\Omega = [(p, q) | -S_h \le p \le S_h, -S_v \le q \le S_v] \quad \text{[Equation 14]}$$

Here, $W'_B$ and $H'_B$ respectively denote horizontal and vertical block sizes in a current image.

Figure 10B:
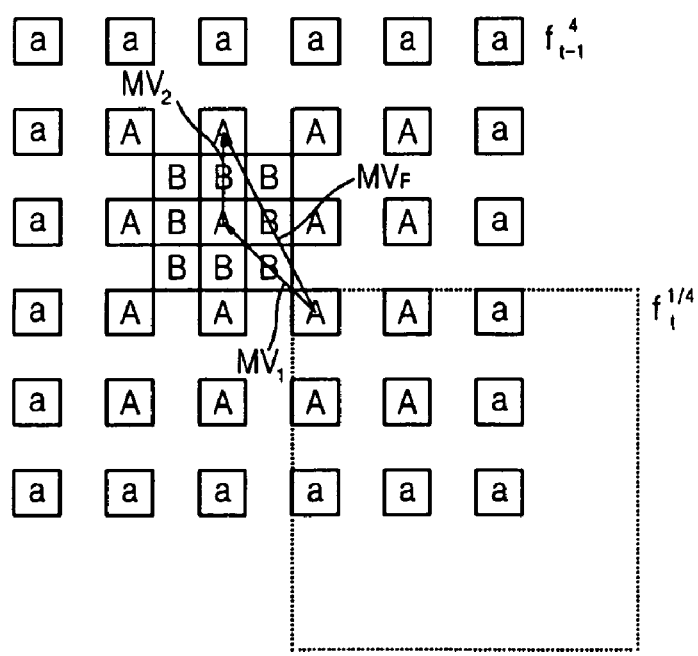

FIG. 10B illustrates an example of a motion vector searching operation performed for every quarter pixel. The motion vector MV obtained for every half pixel according to Equations 12, 13 and 14 is scaled in order to represent a motion by quarter pixels in a reference image $f_{t-1}^4$ having a resolution corresponding to four times of the resolution of a reference image $f_{t-1}$, that is, twice the horizontal resolution and twice the vertical resolution of the reference image $f_{t-1}$, as represented by Equation 15.

$$MV_1 = (mvx_1, mvy_1) = 2 \cdot MV = (2mvx, 2mvy) \quad \text{[Equation 15]}$$

The motion searching operation performed for every quarter pixel obtains a motion vector having a minimum SAD according to Equations 16, 17 and 18.

$$SAD_{\frac{1}{4}}(p, q) = \sum_{i=0}^{W_B} \sum_{j=0}^{H_B} |f_t(i, j) - f_{t-1}^{16}(4i + p, 4j + q)| \quad \text{[Equation 16]}$$

$$MV_2 + \{mvx_2, mvy_2\} = \underset{(p,q) \in \Omega_{\frac{1}{4}}}{\text{argmin}}(SAD_{\frac{1}{4}}(p, q)) \quad \text{[Equation 17]}$$

$$\Omega_{\frac{1}{4}} = \{(p, q) | -1 \le (p - mvx_1) < 1, -1 \le (q - mvy_1) < 1\} \quad \text{[Equation 18]}$$

When the current image and the reference image have the same resolution, as illustrated in FIGS. 9A and 9B, the quantity of computations required for motion estimation can be represented as follows.

First of all, the quantity of computations required for a motion searching operation performed by integer pixels, represented by Equations 1 and 2, is as follows.

$$C_1 = \quad \text{[Equation 19]}$$
$$(2S_H) \cdot (2S_V) \cdot M \cdot W_B \cdot H_B \cdot \frac{W \cdot H}{W_B \cdot H_B} \cdot F \text{ (operations/sec)}$$

Here, M denotes the number of SAD operations per pixel and F represents a frame rate.

The quantity of computations required for a motion searching operation performed by half pixels, represented by Equations 5 and 6, is as follows.

$$C_2 = (3 \times 3 - 1) \cdot M \cdot W_B \cdot H_B \cdot \frac{W \cdot H}{W_B \cdot H_B} \cdot F \text{ (operations/sec)} \quad \text{[Equation 20]}$$

The quantity of computations required for a motion searching operation performed by quarter pixels, represented by Equations 8 and 9, is as follows.

$$C_3 = (3 \times 3 - 1) \cdot M \cdot W_B \cdot H_B \cdot \frac{W \cdot H}{W_B \cdot H_B} \cdot F \text{ (operations/sec)} \quad \text{[Equation 21]}$$

The final quantity of computations required for motion search is as follows.

$$C_F = C_1 + C_2 + C_3 = \quad \text{[Equation 22]}$$
$$(4 \cdot S_H \cdot S_V + 16) \cdot M \cdot W_B \cdot H_B \cdot \frac{W \cdot H}{W_B \cdot H_B} \cdot F$$
$$\text{(operations/sec)}$$

When the resolution of the current image is lower than that of the reference image, as illustrated in FIGS. 10A and 10B, the quantity of computations required for motion estimation can be represented as follows.

First of all, the quantity of computations required for a motion searching operation performed for every half pixel, represented by Equations 12 and 13, is as follows.

$$C_1^{\frac{1}{4}} = \quad \text{[Equation 23]}$$
$$(2S_H) \cdot (2S_V) \cdot M \cdot W_B' \cdot H_B' \cdot \frac{\frac{W}{2} \cdot \frac{H}{2}}{W_B' \cdot H_B'} \cdot F \text{ (operations/sec)}$$

Here, M denotes the number of SAD operations per pixel and F represents a frame rate.

The quantity of computations required for a motion searching operation performed for each quarter pixel, represented by Equations 16 and 17, is as follows.

$$C_2^{\frac{1}{4}} = (3 \times 3 - 1) \cdot M' \cdot W_B' \cdot H_B' \cdot \frac{\frac{W}{2} \cdot \frac{H}{2}}{W_B' \cdot H_B'} \cdot F \text{ (operations/sec)} \quad \text{[Equation 24]}$$

The final quantity of computations required for motion search is as follows.

$$C_3^{\frac{1}{4}} = C_1^{\frac{1}{4}} + C_2^{\frac{1}{4}} = (4 \cdot S_H \cdot S_V + 8) \cdot M \cdot W_B' \cdot H_B' \cdot \frac{\frac{W}{2} \cdot \frac{H}{2}}{W_B' \cdot H_B'} \cdot F \quad \text{[Equation 25]}$$
$$\text{(operations/sec)}$$

In a comparison of the quantity of computations required for the motion searching operation illustrated in FIGS. 9A and 9B with the quantity of computations required for the motion searching operation illustrated in FIGS. 10A and 10B, if the two motion searching operations have the same block size which corresponds to a basic unit of motion estimation, that is, if $W_B = W'_B$ and $H_B = H'_B$, Equation 26 is obtained $$C_F \Big/ C_S^{\frac{1}{4}} = 4 \cdot \frac{(4 \cdot S_H \cdot S_V + 16)}{(4 \cdot S_H \cdot S_V + 8)} \quad \text{[Equation 26]}$$

When the resolution of the input image is decreased by quarter, that is, the horizontal resolution and the vertical resolution of the input image are respectively decreased by half, the quantity of computations required for motion estimation can be reduced by quarter, as represented by Equation 26.

Figure 11A:
FIGS. 11A and 11B respectively illustrate methods of using surrounding pixels for interpolating a reference image for half pixel motion estimation and quarter pixel motion estimation.
Figure 11A:
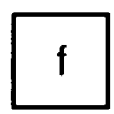
Figure 11A:
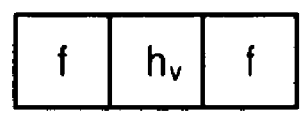
Figure 11A:
Figure 11A:
Figure 11A:
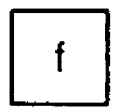
Figure 11A:
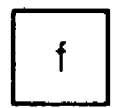
Figure 11A:
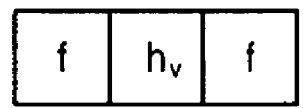
Figure 11A:
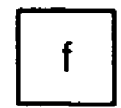
Figure 11A:
Figure 11A:
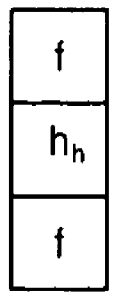
Figure 11A:
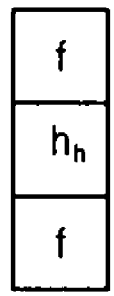
Figure 11A:
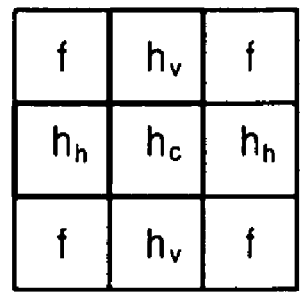
Figure 11A:
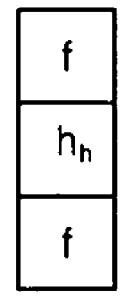
Figure 11A:
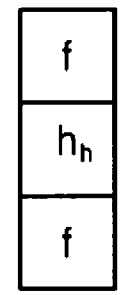
Figure 11A:
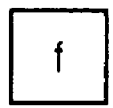
Figure 11A:
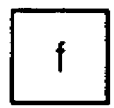
Figure 11A:
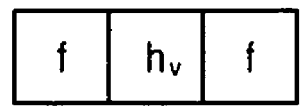
Figure 11A:
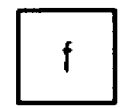
Figure 11A:
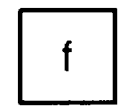
Figure 11A:
Figure 11A:
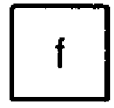
Figure 11A:
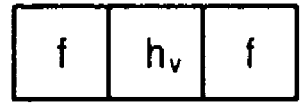
Figure 11A:
Figure 11A:

FIG. 11A illustrates a method for increasing the resolution of a reference image by four times, that is, twice in the horizontal direction and twice in the vertical direction, in order to perform motion compensation for each half pixel. Referring to FIG. 11A, half pixels $h_v$ and $h_h$ are interpolated using integer pixels disposed in proximity thereto in the horizontal and vertical directions.

Figure 11B:
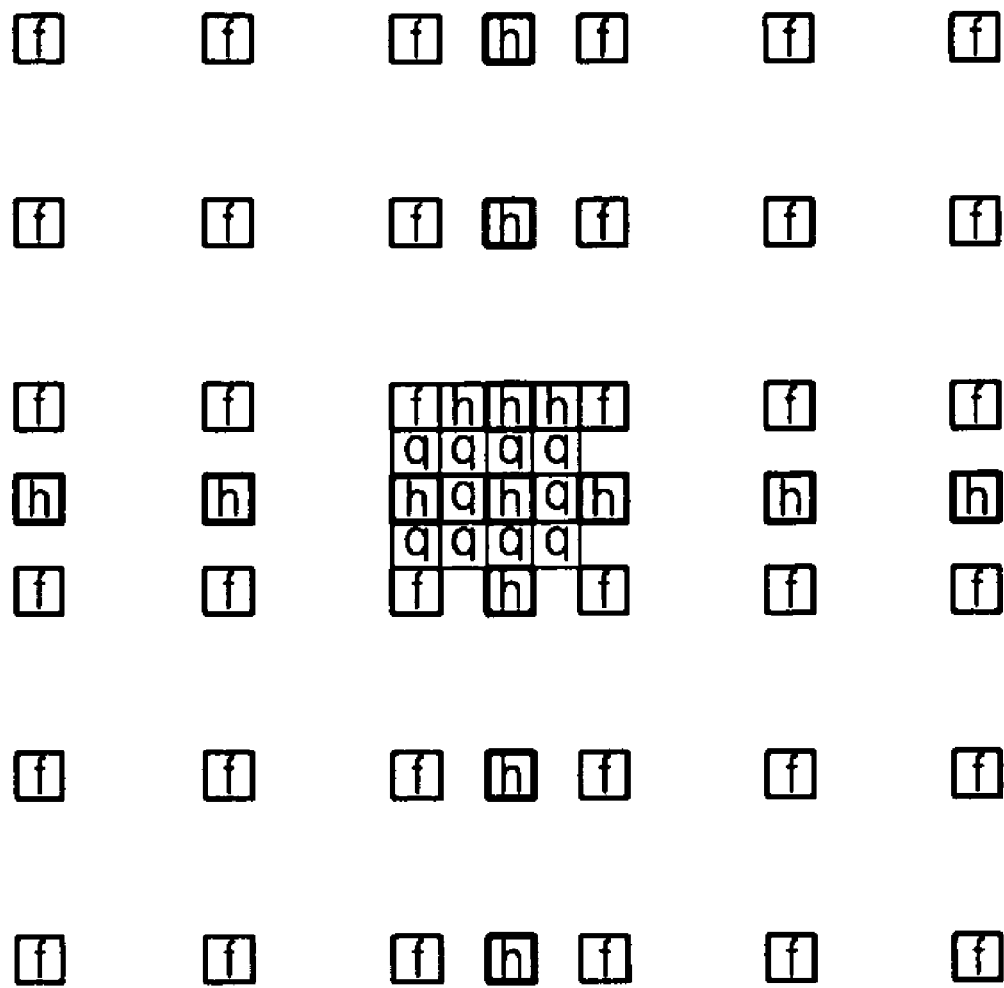

FIG. 11B illustrates a method for increasing the resolution of a reference image by sixteen times, that is, four times in the horizontal direction and four times in the vertical direction, in order to perform motion compensation for each quarter pixel. Referring to FIG. 11B, half pixels h are interpolated using integer pixels disposed in proximity thereto in the horizontal or vertical direction or previously interpolated pixels h located in the middle of the reference image. Quarter pixels q are interpolated using integer pixels disposed in proximity thereto in the horizontal or vertical direction or previously interpolated half pixels h after the half pixels h are interpolated.

Figure 12A:
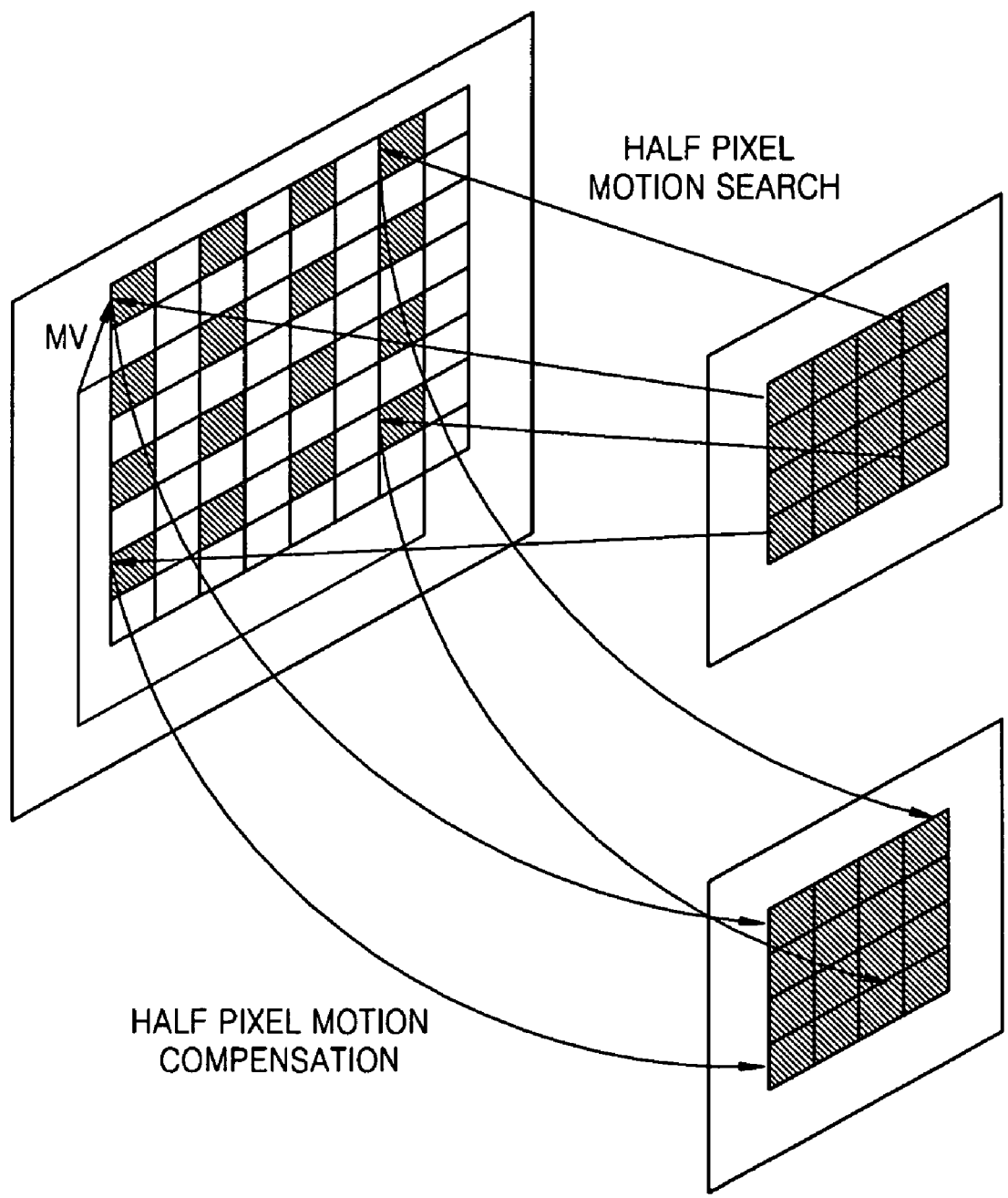
FIG. 12A illustrates a half-pixel motion searching operation performed on a reference image and a current image and a motion compensation operation carried out with the resolution of the current image when the resolution of the current image is lower than the resolution of the reference image.
Figure 12B:
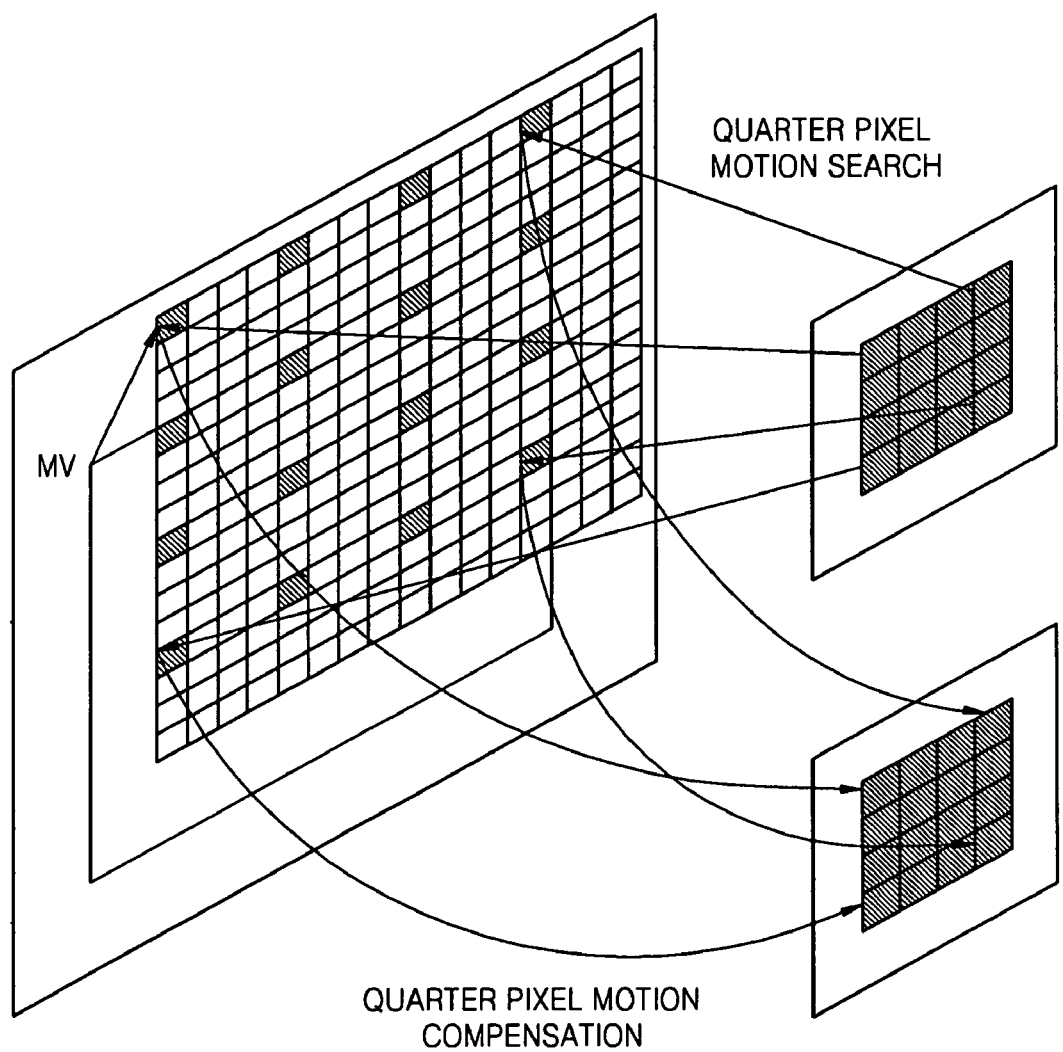
FIG. 12B illustrates a quarter-pixel motion searching operation performed on a reference image and a current image and a motion compensation operation carried out with the resolution of the current image when the resolution of the current image is lower than the resolution of the reference image.

FIGS. 12A and 12B illustrate the motion estimation and compensation operation illustrated in FIG. 5B in detail. FIG. 12A illustrates an operation of performing motion estimation for every half pixel without varying the resolution of the reference image, and then carrying out motion compensation with the resolution of the current image, and FIG. 12B illustrates an operation of increasing the resolution of the reference image by four times, performing motion estimation for every quarter pixel, and then carrying out motion compensation with the resolution of the current image. Referring to FIGS. 12A and 12B, motion estimation can be carried out for each half pixel without varying the resolution of the reference image and motion estimation can be performed for each quarter pixel by increasing the resolution of the reference image by only four times.

Figure 13A:
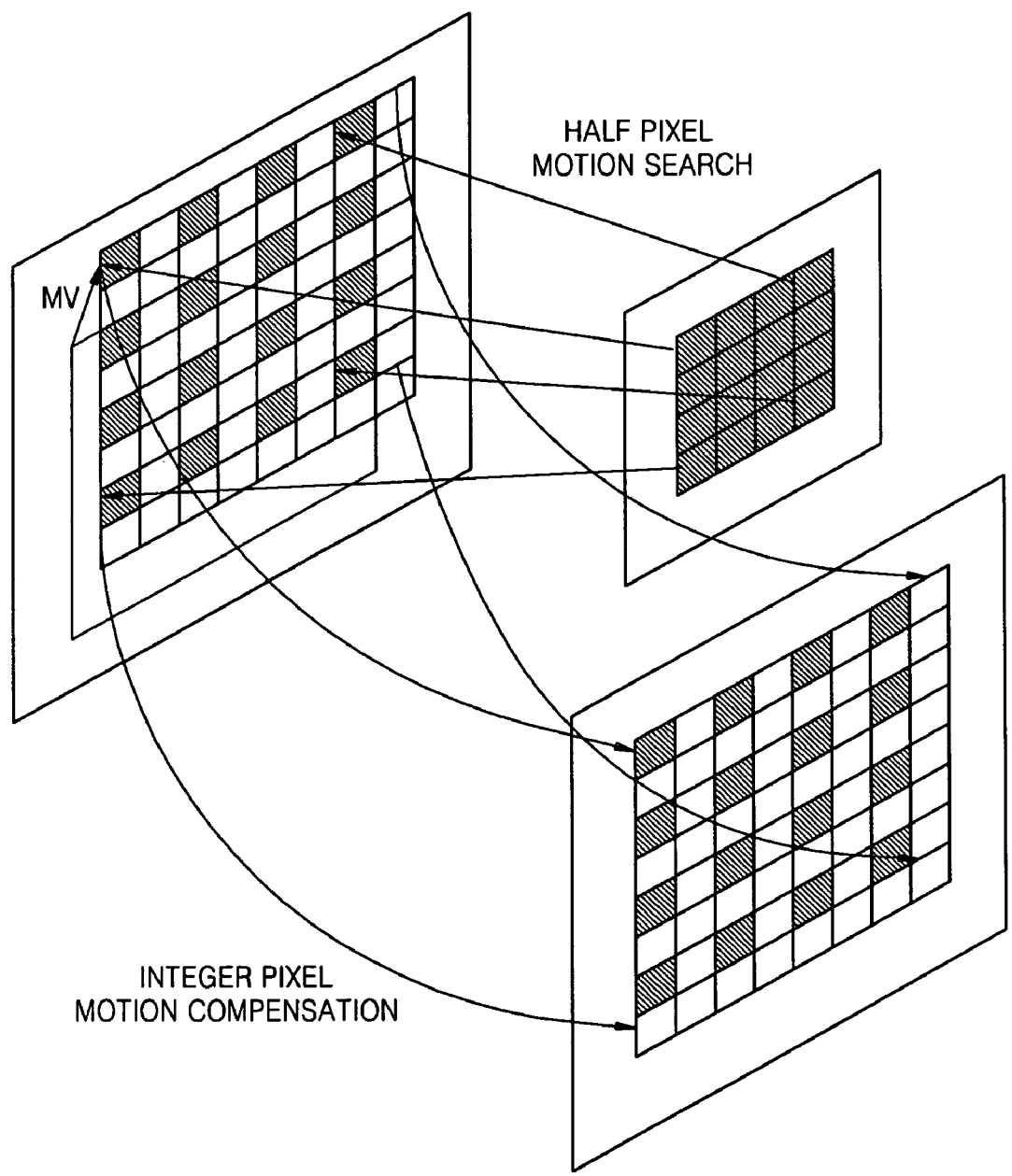
FIG. 13A illustrates a half-pixel motion searching operation performed on a reference image and a current image and a integer-pixel motion compensation operation carried out with the resolution of the reference image when the resolution of the current image is lower than the resolution of the reference image.
Figure 13B:
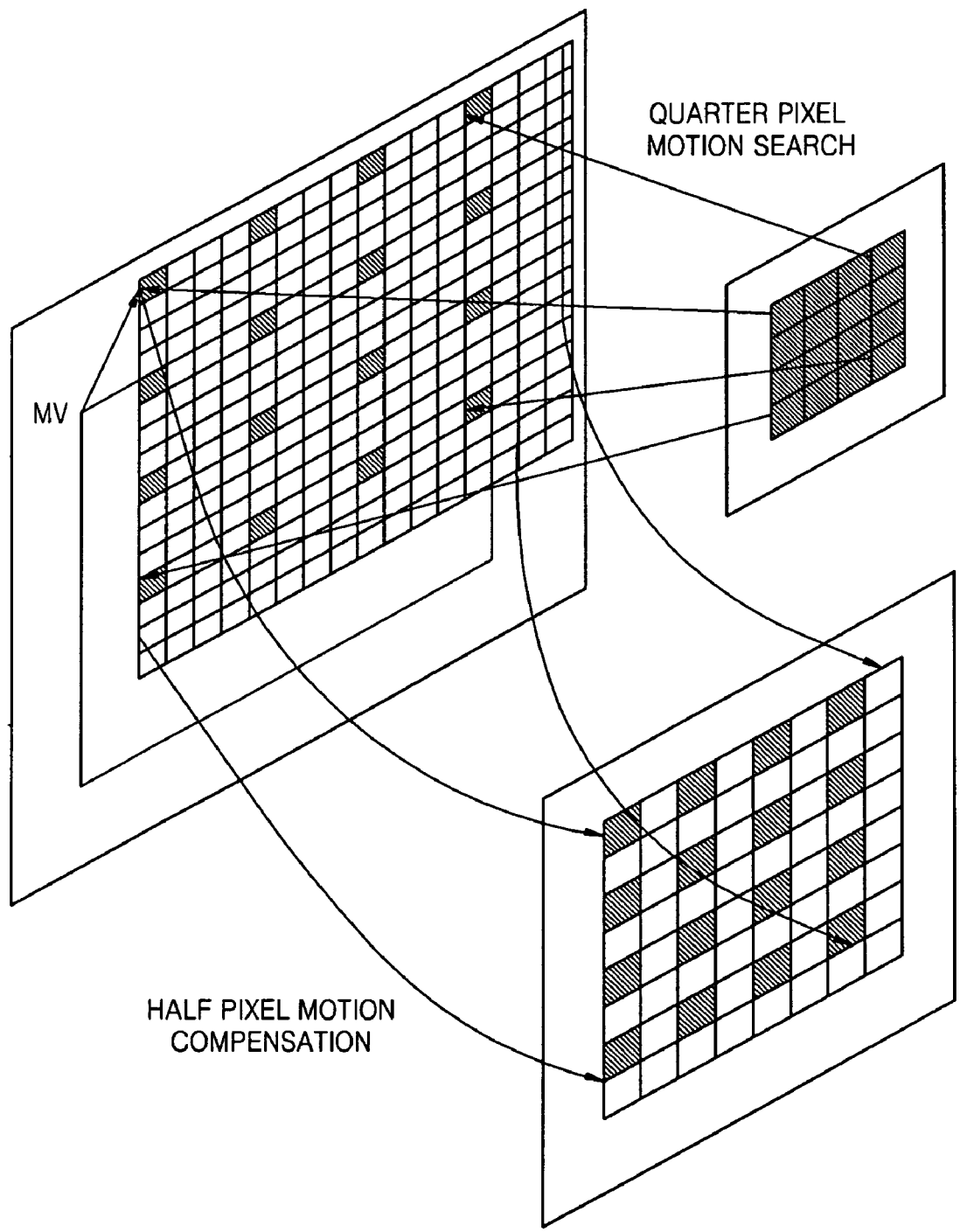
FIG. 13B illustrates a quarter-pixel motion searching operation performed on a reference image and a current image and a half-pixel motion compensation operation carried out with the resolution of the reference image when the resolution of the current image is lower than the resolution of the reference image.

FIGS. 13A and 13B illustrate the motion estimation and compensation operation illustrated in FIG. 7B in detail. FIG. 13A illustrates an operation of performing motion estimation for every half pixel without varying the resolution of the reference image, and then carrying out motion compensation with the resolution of the reference image, and FIG. 12B illustrates an operation of increasing the resolution of the reference image by four times, performing motion estimation for every quarter pixel, and then carrying out motion compensation with the resolution of the reference image. Referring to FIGS. 13A and 13B, motion estimation can be carried out for each half pixel without varying the resolution of the reference image and motion estimation can be performed for each quarter pixel by increasing the resolution of the reference image by only four times.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A video encoding apparatus comprising:
a resolution varying encoder to perform an encoding operation using motion estimation and compensation on a current image having a first resolution and at least one second resolution lower than the first resolution according to a resolution control signal and to generate a bitstream including data encoded with a plurality of resolutions; and
a controller to generate the resolution control signal that controls the resolution varying encoder by indicating whether to change a resolution of inputted frames to the first resolution or the second resolution,
wherein the changed inputted frames switch between the first resolution and the second resolution at a predetermined interval,
wherein the current image having the second resolution is not used as a reference image with regard to a next image.

2. The video encoding apparatus of claim 1, wherein motion estimation is performed on the current image having the second resolution with reference to a previous reconstructed image having the first resolution and carries out motion compensation on the current image with the second resolution.

3. The video encoding apparatus of claim 1, wherein motion estimation is performed on the current image having the second resolution with reference to the previous reconstructed image having the first resolution and carries out motion compensation on the current image with the first resolution.

4. The video encoding apparatus of claim 1, wherein, in the case of an IBP video sequence, the predetermined interval is determined such that the resolution of the video sequence is changed to the second resolution for every B frames.

5. The video encoding apparatus of claim 1, wherein a resolution flag corresponding to the resolution control signal is included in at least one of a sequence header, a GOP (Group Of Pictures) header, a picture header, a frame header and a field header to constitute the bitstream.

6. A video encoding method comprising:
generating a resolution control signal for changing a resolution of inputted frames to a first resolution and at least one second resolution lower than the first resolution; and
performing an encoding operation, controlled by the resolution control signal, using motion estimation and compensation on a current image having the first resolution or the second resolution according to the resolution control signal to generate a bitstream including data encoded with a plurality of resolutions,
wherein the changed inputted frames switch between the first resolution and the second resolution at a predetermined interval,
wherein the current image having the second resolution is not used as a reference image with regard to a next image.

7. The video encoding method of claim 6, wherein motion estimation is performed on the current image having the second resolution with reference to a previous reconstructed image having the first resolution and carries out motion compensation on the current image with the second resolution.

8. The video encoding method of claim 6, wherein motion estimation is performed on the current image having the second resolution with reference to the previous reconstructed image having the first resolution and carries out motion compensation on the current image with the first resolution.

9. The video encoding method of claim 6, wherein, in the case of an IBP video sequence, the predetermined interval is determined such that the resolution of the video sequence is changed to the second resolution for every B frames.

10. The video encoding method of claim 6, wherein a resolution flag corresponding to the resolution control signal is included in at least one of a sequence header, a GOP header, a picture header, a frame header and a field header to constitute a bitstream.

11. A video decoding apparatus comprising:
an analyzer to analyze a bitstream including encoded data at a first resolution and at least one second resolution lower than the first resolution and to generate a resolution control signal corresponding to a resolution flag included in the bitstream; and
a resolution varying decoder, controlled by the generated resolution control signal, to perform a decoding operation using motion compensation on encoded data having the first resolution or the second resolution according to the resolution control signal to generate a reconstructed image,
wherein the encoded data switch between the first resolution and the at least one second resolution at a predetermined interval, and
wherein the current image having the second resolution is not used as a reference image with regard to a next image.

12. The video decoding apparatus of claim 11, wherein motion compensation is performed on the encoded data having the second resolution with the second resolution.

13. The video decoding apparatus of claim 11, wherein motion compensation is performed on the encoded data having the second resolution with the first resolution.

14. The video decoding apparatus of claim 11, wherein the resolution flag corresponding to the resolution control signal is included in at least one of a sequence header, a GOP header, a picture header, a frame header and a field header of the bitstream.

15. A video decoding method comprising:
analyzing a bitstream including encoded data at a first resolution and at least one second resolution lower than the first resolution and generating a resolution control signal corresponding to a resolution flag included in the bitstream; and
performing a decoding operation, controlled by the generated resolution control signal, using motion compensation on encoded data having the first resolution or the second resolution according to the resolution control signal to generate a reconstructed image,
wherein the encoded data switch between the first resolution and the second resolution at a predetermined interval, and
wherein the current image having the second resolution is not used as a reference image with regard to a next image.

16. The video decoding method of claim 15, wherein motion compensation is performed on the encoded data having the second resolution with the second resolution.

17. The video decoding method of claim 15, wherein motion compensation is performed on the encoded data having the second resolution with the first resolution.

18. The video decoding method of claim 15, wherein the resolution flag corresponding to the resolution control signal is included in at least one of a sequence header, a GOP header, a picture header, a frame header and a field header of the bitstream.

19. A non-transitory computer readable recording medium storing a program capable of executing the video encoding method of claim 6.

20. A non-transitory computer readable recording medium storing a program capable of executing the video decoding method of claim 15.

* * * * *